(12) United States Patent
Sharp

(10) Patent No.: US 11,226,483 B2
(45) Date of Patent: Jan. 18, 2022

(54) REVERSE-ORDER CROSSED PANCAKE LENS WITH A SHAPED POLARIZER

(71) Applicant: Facebook Technologies, LLC, Menlo Park, CA (US)

(72) Inventor: Gary Dean Sharp, Boulder, CO (US)

(73) Assignee: Facebook Technologies, LLC, Menlo Park, CA (US)

( * ) Notice: Subject to any disclaimer, the term of this patent is extended or adjusted under 35 U.S.C. 154(b) by 111 days.

(21) Appl. No.: 16/159,752

(22) Filed: Oct. 15, 2018

(65) Prior Publication Data
US 2019/0377183 A1   Dec. 12, 2019

Related U.S. Application Data

(60) Provisional application No. 62/682,041, filed on Jun. 7, 2018.

(51) Int. Cl.
*G02B 27/01* (2006.01)
*G02B 27/00* (2006.01)
(Continued)

(52) U.S. Cl.
CPC ....... *G02B 27/0018* (2013.01); *G02B 5/3058* (2013.01); *G02B 5/3066* (2013.01);
(Continued)

(58) Field of Classification Search
CPC ............. G02B 27/0018; G02B 5/3058; G02B 5/3066; G02B 5/3083; G02B 27/0025; G02B 27/0037; G02B 27/0093; G02B 27/0172; G02B 27/0983; G02B 27/283; G02B 27/286
(Continued)

(56) References Cited

U.S. PATENT DOCUMENTS 3,183,763 A   5/1965   Koester
3,432,225 A   3/1969   Rock et al.
(Continued)

FOREIGN PATENT DOCUMENTS

JP   H11-237584 A   8/1999
JP   2009-238363 A   10/2009
(Continued)

OTHER PUBLICATIONS

Wikipedia webpage "Polarizer" (Year: 2018).*
(Continued)

*Primary Examiner* — George G. King
(74) *Attorney, Agent, or Firm* — FisherBroyles, LLP

(57) ABSTRACT

In various embodiments, a pancake lens block including a shaped reflective polarizer is described. In an embodiment, the shaped reflective polarizer may include an optical element that may be configured to transmit at least a portion of light from a light source. Further, the shaped reflective polarizer may include a wire-grid polarizer that comprises (i) a bolstering substrate, (ii) a wire-grid substrate coupled to the bolstering substrate, and (iii) wire-grids disposed on the wire-grid substrate. The shaped reflective polarizer may be spaced from the optical element by a distance, which may include a cavity filled with a material (such as air or a nanovoided material).

14 Claims, 13 Drawing Sheets

(51) Int. Cl.
*G02B 5/30* (2006.01)
*G02B 27/28* (2006.01)
*G02B 27/09* (2006.01)

(52) U.S. Cl.
CPC ....... *G02B 5/3083* (2013.01); *G02B 27/0025* (2013.01); *G02B 27/0037* (2013.01); *G02B 27/0093* (2013.01); *G02B 27/0172* (2013.01); *G02B 27/0983* (2013.01); *G02B 27/283* (2013.01); *G02B 27/286* (2013.01)

(58) Field of Classification Search
USPC ........................................ 359/485.05, 487.03
See application file for complete search history.

(56) References Cited

U.S. PATENT DOCUMENTS

| | | | |
|---|---|---|---|
| 3,479,168 | A * | 11/1969 | Maxfield, Jr. ......... C03B 37/028 |
| | | | 65/439 |
| 5,349,379 | A | 9/1994 | Eichenlaub |
| 5,410,345 | A | 4/1995 | Eichenlaub |
| 5,428,366 | A | 6/1995 | Eichenlaub |
| 5,966,242 | A | 10/1999 | Yamanaka |
| 5,973,760 | A | 10/1999 | Dehmlow |
| 6,583,930 | B1 | 6/2003 | Schrenk et al. |
| 7,662,436 | B1 | 2/2010 | Wei et al. |
| 8,780,039 | B2 | 7/2014 | Gay et al. |
| 8,780,285 | B1 | 7/2014 | Stuppi et al. |
| 9,110,245 | B2 | 8/2015 | Derks et al. |
| 9,513,420 | B2 | 12/2016 | Derks et al. |
| 9,555,589 | B1 | 1/2017 | Ambur et al. |
| 2002/0169267 | A1 | 11/2002 | Minakuchi et al. |
| 2003/0086171 | A1 | 5/2003 | McGuire |
| 2004/0125291 | A1 | 7/2004 | Kawahara et al. |
| 2005/0179048 | A1 | 8/2005 | Yamanaka et al. |
| 2006/0146682 | A1 | 7/2006 | Sharp |
| 2006/0159958 | A1* | 7/2006 | Lee ...................... G02B 5/3058 |
| | | | 428/690 |
| 2006/0268207 | A1 | 11/2006 | Tan et al. |
| 2007/0070508 | A1 | 3/2007 | Ruhle et al. |
| 2007/0159582 | A1 | 7/2007 | Kwok et al. |
| 2007/0279553 | A1 | 12/2007 | Yoda et al. |
| 2008/0297898 | A1 | 12/2008 | Martin |
| 2010/0177113 | A1 | 7/2010 | Gay et al. |
| 2011/0193814 | A1 | 8/2011 | Gay et al. |
| 2012/0120365 | A1 | 5/2012 | Legerton et al. |
| 2013/0057958 | A1 | 3/2013 | Minoura et al. |
| 2014/0293142 | A1* | 10/2014 | Kawazu ................ G03B 21/14 |
| | | | 349/5 |
| 2014/0327861 | A1 | 11/2014 | Huang et al. |
| 2016/0011353 | A1 | 1/2016 | Escuti et al. |
| 2016/0070104 | A1 | 3/2016 | Yang |
| 2016/0131920 | A1 | 5/2016 | Cook |
| 2017/0045737 | A1 | 2/2017 | Cammenga et al. |
| 2017/0068029 | A1 | 3/2017 | Yun et al. |
| 2017/0068096 | A1 | 3/2017 | Ouderkirk et al. |
| 2017/0168302 | A1 | 6/2017 | McDowall et al. |
| 2017/0255015 | A1 | 9/2017 | Geng et al. |
| 2017/0269368 | A1 | 9/2017 | Yun et al. |
| 2017/0276960 | A1 | 9/2017 | Osterman et al. |
| 2017/0358136 | A1 | 12/2017 | Gollier et al. |
| 2018/0031835 | A1 | 2/2018 | Hoppe |
| 2018/0039052 | A1 | 2/2018 | Khan et al. |
| 2018/0059296 | A1 | 3/2018 | Ouderkirk et al. |
| 2018/0101020 | A1 | 4/2018 | Gollier et al. |
| 2018/0120579 | A1 | 5/2018 | Gollier et al. |
| 2018/0149862 | A1 | 5/2018 | Kessler et al. |

FOREIGN PATENT DOCUMENTS

| | | |
|---|---|---|
| JP | 2012-247748 A | 12/2012 |
| JP | 5147910 B2 | 2/2013 |
| JP | 2013-200482 A | 10/2013 |
| JP | 2015-184629 A | 10/2015 |
| WO | 94/06249 A1 | 3/1994 |
| WO | 2018/093633 A1 | 5/2018 |

OTHER PUBLICATIONS

International Search Report and Written Opinion received for PCT Application Serial No. PCT/US2018/064366 dated Apr. 3, 2019, 18 pages.
International Search Report and Written Opinion for PCT Application Serial No. PCT/US2018/064362 dated Mar. 29, 2019, 11 pages.
International Search Report and Written Opinion for PCT Application Serial No. PCT/US2018/064363 dated Mar. 28, 2019, 18 pages.
Sharp, Gary Dean, "Head Mounted Display Including A Reverse-Order Crossed Pancake Lens", U.S. Appl. No. 16/160,128, filed Oct. 15, 2018, 95 pages.
Sharp, Gary Dean, "Reverse-Order Crossed Pancake Lens With Azimuthal Compensation", U.S. Appl. No. 16/159,747, filed Oct. 15, 2018, 85 pages.
Sharp, Gary Dean, "Reverse-Order Crossed Pancake Lens With Index Gradient Structure", U.S. Appl. No. 16/159,757, filed Oct. 15, 2018, 91 pages.
Escuti et al., "Geometric-Phase Holograms", Optics & Photonics News, Feb. 2016, 8 pages.
Pancharatnam, S., "Generalized Theory of Interference, and its Applications", Part I, Coherent Pencils, Memoir No. 88 of the Raman Research Institute, Oct. 30, 1956, pp. 247-262, Bangalore, India.
3M Optical Systems, "Vikuiti Dual Brightness Enhancement Film—Matte (DBEF-M)", URL: multimedia.3m.com/mws/media/152671O/vikuiti-tm-dbef-m.pdf, 2008, 4 pages.
Extended European Search Report received for EP Patent Application Serial No. 18921861 3 dated Jun. 11, 2021, 13 pages.
Extended European Search Report received for EP Patent Application Serial No. 18921615 3 dated Jun. 18, 2021, 11 pages.
Extended European Search Report received for EP Patent Application Serial No. 18921577 5 dated Jun. 7, 2021, 13 pages.
Cai et al., "Recent advances in antireflective surfaces based on nanostructure arrays", Mater. Horiz , vol. 2, No. 1, Jan. 1, 2015, pp. 37-53.
Lee, Michelle, "Moth Eyes: A New Vision for Light-Harnessing Efficiency", Remarkable Natural Material Surfaces and Their Engineering Potential, Springer, Jan. 1, 2014, pp. 79-89.
Extended European Search Report received for EP Patent Application Serial No. 18921964 5 dated Jun. 28, 2021, 15 pages.
Li et al., "Liquid Crystalline Epoxy Resins", Chapter 1, Liquid Crystalline Polymers, Springer, Jan. 1, 2016, pp. 1-17,.
Wikipedia, "Pancake lens", URL: https://en.wikipedia org/w/index.php?title=Pancake_lens&oldid=822604383, Jan. 27, 2018, 4 pages.
Notice of Allowance received for U.S. Appl. No. 16/159,747 dated Jul. 19, 2021, 20 pages.
Chen S., et al., "Special Positive Birefringence Properties of Mesogen-Jacketed Liquid Crystalline Polymer Films for Optical Compensators," Polymer Chemistry, 2010, vol. 1, pp. 430-433.
Cranston E.D., et al., "Birefringence in Spin-Coated Films containing Cellulose Nanocrystals," Colloids and Surfaces A: Physicochemical and Engineering Aspects, 2008, vol. 325, pp. 44-51.
International Preliminary Report on Patentability for International Application No. PCT/US2018/064361, dated Dec. 17, 2020, 7 Pages.
International Preliminary Report on Patentability for International Application No. PCT/US2018/064362, dated Dec. 17, 2020, 6 Pages.
International Preliminary Report on Patentability for International Application No. PCT/US2018/064363, dated Dec. 17, 2020, 12 Pages.
International Preliminary Report on Patentability for International Application No. PCT/US2018/064366, dated Dec. 17, 2020, 12 Pages.
International Search Report and Written Opinion for International Application No. PCT/US2018/064361, dated May 2, 2019, 11 Pages.

(56) References Cited

OTHER PUBLICATIONS

"Lens," Wikipedia Webpage, 2018, 17 pages.
Min I., et al., "Dynamic Measurement of Stress Optical Behavior of Three Amorphous Polymers," Korea-Australia Rheology Journal, 2012, vol. 24 (1), pp. 73-79.
Pancharatnam S., "Achromatic Combinations of Birefringent Plates," Part II. An Achromatic Quarter-Wave Plate, Proceedings of the Indian Academy of Sciences, Mar. 5, 1955, pp. 137-144.

\* cited by examiner

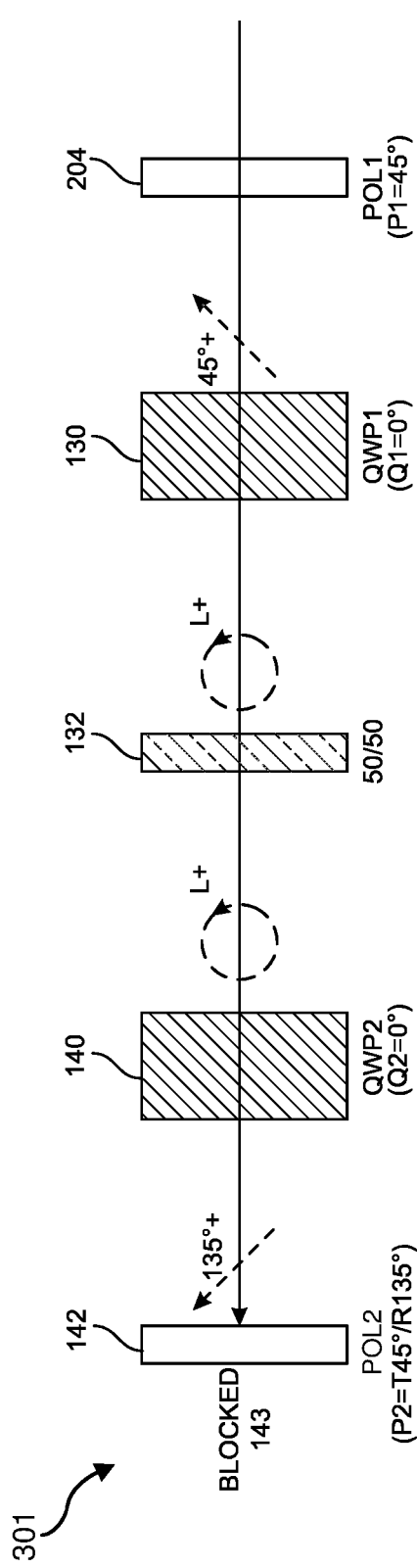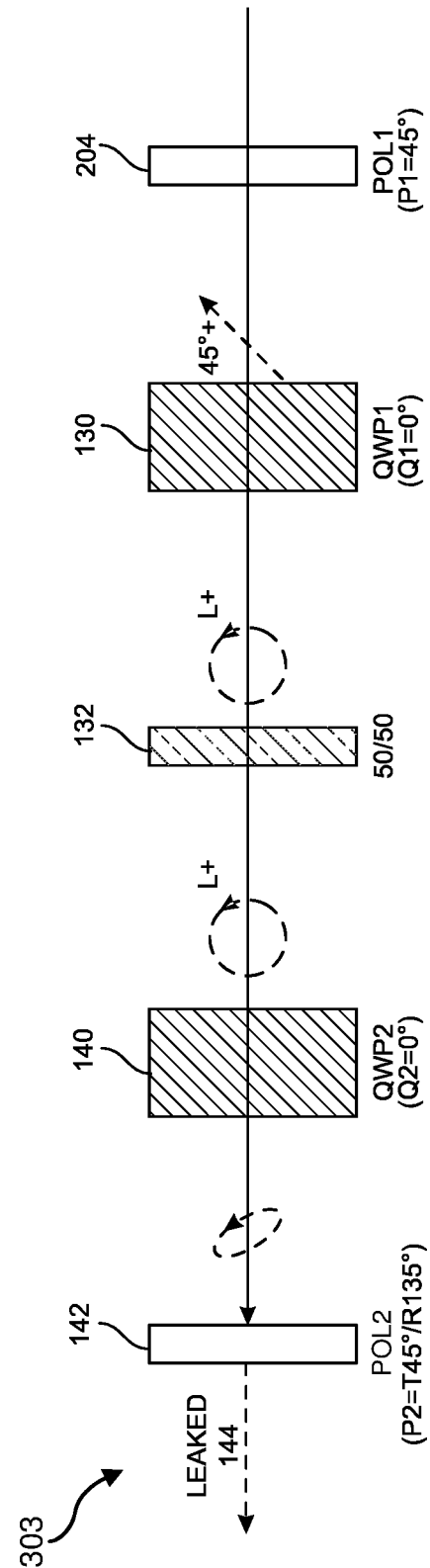

REVERSE-ORDER CROSSED PANCAKE LENS WITH A SHAPED POLARIZER

CROSS REFERENCE TO RELATED APPLICATION

This application is a non-provisional utility application which claims the benefit of U.S. Provisional Application No. 62/682,041 filed 7 Jun. 2018, the disclosure of which is incorporated, in its entirety, by this reference.

BACKGROUND

In a head-mounted display (HMD), a user's eye typically occupies a region of space generally referred to as an eye box, and a respective eye box may be provided for each of the user's eyes. HMDs often display and direct content to the eye boxes, for example, using one or more optical elements. Unfortunately, light reflected between the various optical elements within the HMD may generate parasitic light in the process. This may lead to reduced contrast in the content being presented to the user. In particular, systems with polarizing elements may introduce parasitic light and/or ghost images that may reduce image quality and, thus, the user's overall experience.

SUMMARY

In some embodiments, a pancake lens block is described. In at least one embodiment, the pancake lens block may include (i) an optical element configured to transmit at least a portion of radiation from a radiation source, and (ii) a shaped reflective polarizer spaced at a distance from the optical element. Further, the shaped reflective polarizer may be configured to provide achromatic optical power to the pancake lens block. In one embodiment, the distance may be configured to provide additional optical path length in the pancake lens block, and the distance may be provided by at least one of an air gap or a material.

In some embodiments, the optical element may include (i) a first retarder having a first axis of orientation, where the first retarder may be configured to selectively transmit a portion of the radiation from the radiation source, (ii) a partial reflector that receives the portion of radiation from the first retarder and transmits the portion of radiation, and (iii) a second retarder having a surface at a distance from the shaped reflective polarizer, where the second retarder may be oriented to a second axis of orientation that may be substantially orthogonal to the first axis of orientation, and where the second retarder transmits the portion of radiation from the partial reflector. In some embodiments, the shaped reflective polarizer may be configured to reflect the portion of radiation transmitted by the second retarder back to the partial reflector through the second retarder, where the partial reflector reflects a second portion of the radiation from the second retarder back to the shaped reflective polarizer.

The shaped reflective polarizer may include a wire-grid polarizer. The wire-grid polarizer may include (i) a bolstering substrate, (ii) a wire-grid substrate coupled to the bolstering substrate, and (iii) wire-grids disposed on the wire-grid substrate. The bolstering substrate may provide mechanical support to the wire-grid polarizer and may maintain the polarization state of the portion of radiation transmitted by the second retarder. In one aspect, the shaped reflective polarizer may have a surface that may be convex, concave, flat, or irregular. Further, the wire-grid polarizer may be disposed on a lens having a radius of curvature, and the thickness of the bolstering substrate may be at least partially based on the radius of curvature. In some embodiments, the wire-grid polarizer may be thermoformed and the bolstering substrate may have a glass transition temperature characterized by an associated rate of change with temperature being below a threshold. The bolstering substrate may include a tri-acetyl cellulose (TAC) material or a polymethyl methacrylate (PMMA) material. In at least one embodiment, the wire-grid substrate may include a TAC material or a PMMA material. Further, the wire-grids may include a TAC material.

In some embodiments, a head mounted display (HMD) may include an electronic display configured to emit light and a pancake lens block. The pancake lens block may include (i) an optical element configured to transmit at least a portion of the light emitted by the electronic display, and (ii) a shaped reflective polarizer spaced at a distance from the optical element. Further, the shaped reflective polarizer may be configured to provide achromatic optical power to the pancake lens block.

In some embodiments, the optical element may include (i) a first retarder having a first axis of orientation, where the first retarder may be configured to selectively transmit a portion of the light emitted by the electronic display, (ii) a partial reflector that receives the portion of light from the first retarder and transmits the portion of light, and (iii) a second retarder having a surface at a distance from the shaped reflective polarizer. Further, the second retarder may be oriented to a second axis of orientation that may be substantially orthogonal to the first axis of orientation, and where the second retarder transmits the portion of light from the partial reflector. In some embodiments, the shaped reflective polarizer may be configured to reflect the portion of light transmitted by the second retarder back to the partial reflector through the second retarder, where the partial reflector reflects a second portion of the light from the second retarder back to the shaped reflective polarizer.

The shaped reflective polarizer may include a wire-grid polarizer, which may further include (i) a bolstering substrate, (ii) a wire-grid substrate coupled to the bolstering substrate, and (iii) wire-grids disposed on the wire-grid substrate. In some embodiments, the bolstering substrate may include a TAC material or a PMMA material. Moreover, the wire-grid polarizer may be disposed on a lens having a radius of curvature, and the thickness of the bolstering substrate may be at least partially based on the radius of curvature.

A method of assembling a pancake lens block may include (i) configurating an optical element to transmit at least a portion of radiation from a radiation source, and (ii) spacing a shaped reflective polarizer from the optical element by a distance, where the shaped reflective polarizer may be configured to provide achromatic optical power to the pancake lens block. In some embodiments, the shaped reflective polarizer may include a wire-grid polarizer that may include (i) a bolstering substrate, (ii) a wire-grid substrate coupled to the bolstering substrate, and (iii) wire-grids disposed on the wire-grid substrate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF FIGURES

The accompanying figures and appendices illustrate a number of exemplary embodiments and are a part of the specification. Together with the following description, these figures and appendices demonstrate and explain various principles of the instant disclosure.

FIG. 3B shows an exemplary pancake lens block configuration (aligned to produce polarization leakage with wavelength and ray angle) that blocks light during a first see-through path at the designed wavelength (so both compound retarders serve as quarter-waveplates), in accordance with one embodiment.

FIG. 3C shows an exemplary pancake lens block configuration (aligned to produce the polarization leakage with wavelength and ray angle) that leaks light during a first see-through path for another wavelength (so both compound retarders do not serve as quarter-waveplates), in accordance with one embodiment.

Figure 1:
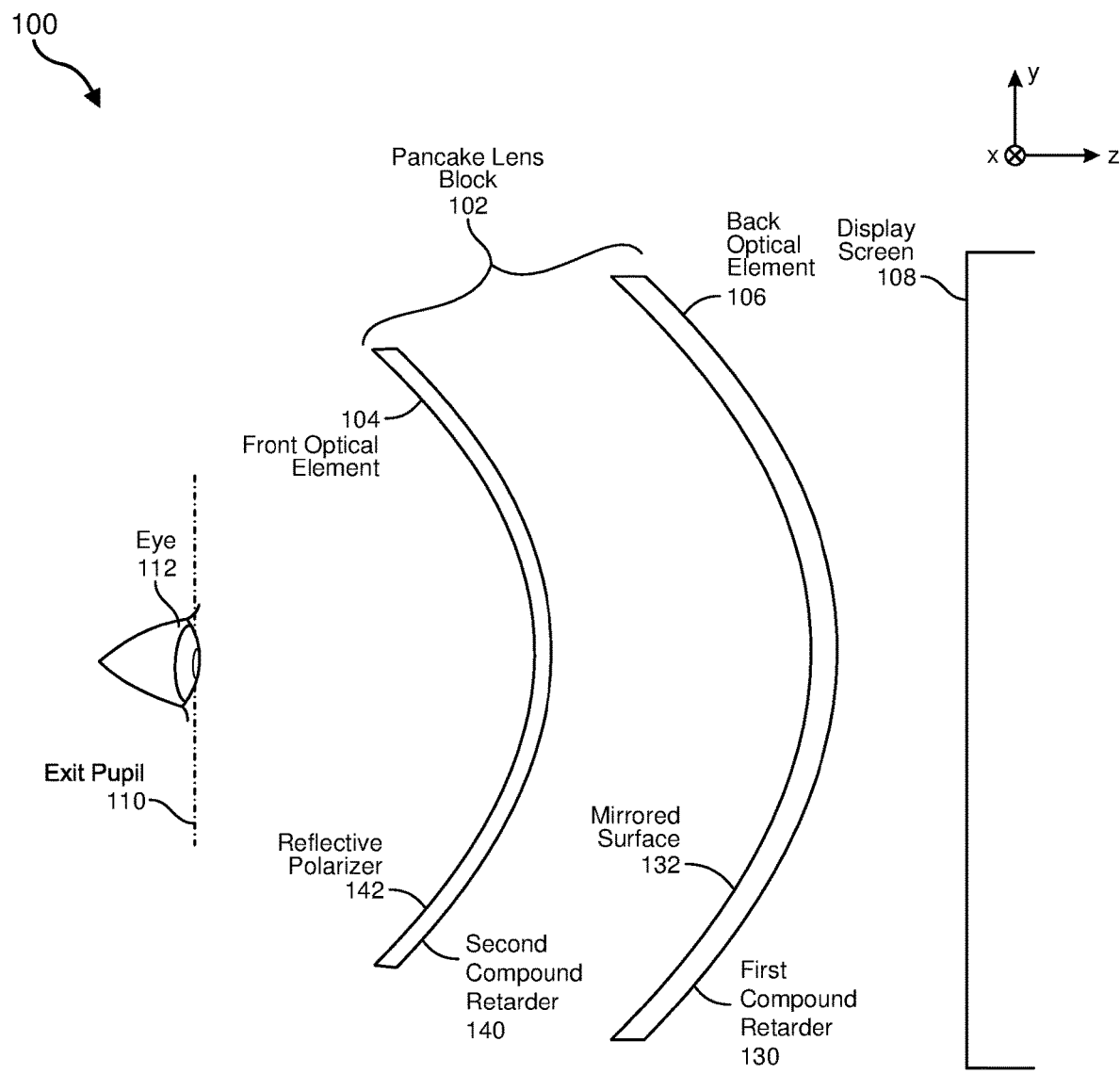
FIG. 1 shows an example pancake lens block, in accordance with one embodiment.

Throughout the figures, identical reference characters and descriptions indicate similar, but not necessarily identical, elements. While the exemplary embodiments described herein are susceptible to various modifications and alternative forms, specific embodiments have been shown by way of example in the appendices and will be described in detail herein. However, the exemplary embodiments described herein are not intended to be limited to the particular forms disclosed. Rather, the instant disclosure covers all modifications, equivalents, and alternatives falling within this disclosure.

DETAILED DESCRIPTION OF EXEMPLARY EMBODIMENTS

The present disclosure is generally directed to enhancing images from electronic displays, and more specifically to reducing light leakage within an optical system including electronic displays.

In some embodiments, a reverse-order crossed (ROC) architecture for a pancake lens may include a first polarizer (e.g., linear polarizer), a first compound retarder (e.g., a retarder including multiple individual retarders, such as quarter-wave plates (QWPs)), a partial reflector, a second compound retarder (e.g., a retarder including multiple QWPs), and a reflective (e.g., beam-splitting) polarizer. In some embodiments, the term "compound retarder" may refer to an engineered stack of retarders (e.g., linear retarders), where the retardation and orientation of each layer in the stack may be designed to transform radiation (e.g., light) of a particular input polarization to radiation of a prescribed output polarization as a function of wavelength. Light received (e.g., from a display) may propagate through the pancake lens, where the light may undergo multiple controlled reflections and transmissions achieved by coordinating changes in polarization of light through these optical elements. In some embodiments, the first compound retarder and the second compound retarder may include a plurality of retarders (e.g., retarders including QWPs), for example, two, three, four, or more retarders.

The term "compound retarder" can be used to describe an engineered stack of linear retarders that may serve to generate a specified polarization transformation as a function of wavelength. In some instances, the compound retarder may serve to convert a uniform linear state of polarization (SOP) to a uniform circular SOP. The term may be used to encompass all such structures, without the additional constraint that the structure behave as a composite linear retarder (i.e. that it have linear eigen-polarizations).

In some embodiments, to prevent parasitic light (e.g., ghost images) from degrading image quality, an optical axis (e.g., a fast axis or a slow axis) of the second compound retarder may be oriented approximately ninety degrees (orthogonal) relative to the optical axis of the first compound retarder (i.e., corresponding to the "cross" configuration designation of the reverse-order crossed pancake lens block). Further, the first compound retarder and the second compound retarder may each include multiple retarders (e.g., three QWPs) arranged in a stack. In some embodiments, the order of the multiple retarding elements (e.g., QWPs) included in the first compound retarder-stack and the order for the multiple retarding elements for the second compound retarder-stack may be the reverse of one another, yielding the "reverse-order" configuration nomenclature of the ROC. For example, first, second, and third QWPs (e.g., labeled as A, B, and C) in the first compound retarder may map to third, second, and first QWPs (e.g., labeled as C, B, and A) in the second compound retarder.

In some embodiments, the ROC architecture may be implemented independently of the retardation magnitude or the axis of orientation of any given retarding element (e.g., any given QWP) of the compound retarding elements. In some embodiments, the optical axis of orientation of the retarders (e.g., the QWPs) in the compound retarders may be the fast axis (e.g., corresponding to the optical axis of orientation for a retarder including a negative uniaxial material) or the slow axis (e.g., corresponding to the optical axis of orientation for a retarder including a positive uniaxial material), or some other axis by which the retarding elements are oriented relative to each other. The compound retarders may additionally exhibit the same or similar behavior with respect to retardance variation versus wavelength and incidence angle.

In some embodiments, the ROC architecture may serve to change a spectral shape of a transformation function that light undergoes during the light's traversal through the first and second compound retarders of the pancake lens block. Further, while the ROC architecture described herein may be designed for visible light, in other embodiments, the transformation function of a pancake lens block may also be designed for radiation of different wavelength ranges (e.g., near-infrared radiation, ultraviolet radiation, and the like).

In at least one embodiment, a first compound retarder may be considered as a "black box" (e.g., a device which can be viewed in terms of its inputs and outputs) that may convert linearly polarized light to circularly polarized light in a range (e.g., visible range) of wavelengths. Moreover, a similarly designed second compound retarder having a compound optical axis that is rotated by approximately ninety degrees with respect to the first compound retarder compound optical axis may be used in the pancake lens block to convert the light traversed through the first compound retarder and the second compound retarder back to linearly polarized light having the same orientation as the orientation of the originally incident light on the first compound retarder.

In at least one embodiment, the first compound retarder may be a contrast determining element that may be sensitive to small optical imperfections. Therefore, the output of the first compound retarder may not be light having circular polarization, but rather, may be light having elliptical polarization, which may lead to compounding optical effects in the pancake lens. In some embodiments, the greater the number of components (e.g., five QWPs, or any odd number of QWPs) in a given compound retarder, the better the compound retarder may transform the linearly polarized light to circularly polarized light for light having normal incidence. For such a multi-layer (e.g., five layer) compound retarder, a second, substantially similar compound retarder in a ROC configuration placed in series with the multi-layer compound retarder may be able to transform the SOP of the originally incident light and thereby restore the original linear polarization of the light. However, when the incident light on the multi-layer compound retarders in the ROC configuration is off-normal, such multi-layer compound retarders may distort the polarization state of the light.

In at least one embodiment, for an ROC pancake lens block including two compound retarders in series, the two compound retarders may have no net effect on the polarization state of light at the output of the two compound retarders if the interim polarization state (e.g., the polarization state of the light at the output of the first compound retarder and before the input of the second compound retarder) is circularly polarized, assuming normally incident light at the input of the first compound retarder. If the interim polarization state of the light is not circular polarization, the two compound retarders may not fully restore the linear polarization state of the light at the output of the second compound retarder, leading to reduced contrast in the pancake lens block. In some embodiments, a pair of compound retarders in the ROC arrangement may restore the input state-of-polarization of light at normal incidence, at least in part because the composite Jones matrix corresponding to the compound retarders in the ROC arrangement is an identity matrix. Further, the composite Jones matrix may be the identity matrix regardless of the transformation associated with the first compound retarder or the corresponding number of retarders (e.g., number of QWPs), optical axes of orientation of the retarders (e.g., angles of the QWPs), and the retardation values of the retarders (e.g., retardation values of the QWPs) used in the first compound retarder. In some embodiments, a deviation from the ROC relationship between the compound retarders may result in a departure from the identity matrix for the composite Jones matrix associated with the ROC pancake lens block.

In some embodiments, the retardances of the constituent elements (e.g., constituent QWPs) for each of the compound retarders may be equal, and the axes of orientations of the constituent elements (e.g., axes of orientation of the constituent QWPs) of the two compound retarders may be crossed (e.g., made orthogonal to one another) between the two compound retarders. In some embodiments, the polarization state of light may be a circular polarization at the midpoint (e.g., the output of the first compound retarder and the input of the second compound retarder). Further, the polarization state (e.g., linear polarization) of the light incident on the first compound retarder may be restored at the output of the second compound retarder (e.g., the same linear polarization). In at least one embodiment, a trade-off in the design of the ROC pancake lens architecture may exist in that designs that may accommodate for wide-angles of incidence may require small component counts (e.g., three QWPs in each compound retarder), while designs that are optimized for achromaticity and the generation of circular polarization at the midpoint between compound retarders may favor high component counts (e.g., greater than three QWPs in each compound retarder).

FIG. 1 shows a cross sectional view 100 of an embodiment of pancake lens block 102 in accordance with one embodiment. In at least one embodiment, pancake lens block 102 may be configured to provide a folded optical path by utilizing polarizing optical components and providing optical power in a compact optical system. Pancake lens block 102, in some embodiments, may be part of a head-mounted display and may include front optical element 104 and back optical element 106 that focuses light from electronic display screen 108 to exit pupil 110 where an eye 112 of a user is positioned when viewing content on electronic display screen 108.

For purposes of illustration, FIG. 1 shows a cross section 100 of pancake lens block 102 associated with a single eye 112, but another pancake lens assembly, separate from pancake lens block 102 shown in FIG. 1, may provide altered image light to another eye of the user. Some embodiments of the pancake lens have different components than those described here. Similarly, in some cases, functions may be distributed among the components in a different manner than is described here.

Light emitted from electronic display 108 may be linearly polarized. In some embodiments, electronic display 108 includes one or more linear polarizers (POL1, to be shown and described in connection with FIG. 2, below) that linearly polarize light emitted from electronic display 108. Alternatively, light emitted from light emitting components (e.g., light-emitting diodes, LEDs) may be emitted as linearly polarized light.

Pancake lens block 102 illustrated in FIG. 1 includes front optical element 104 and back optical element 106. One or more surfaces of front optical element 104 and back optical element 106 may be shaped, for example, to correct for one or more optical aberrations, such as field curvature. For example, one or more surfaces of front optical element 104 may be shaped to be spherically concave (e.g., a portion of a sphere), spherically convex, planar, a rotationally symmetric sphere, a freeform shape, or some other shape that mitigates one or more optical aberrations, such as field curvature. In some embodiments, the shape of one or more surfaces of front optical element 104 and back optical element 106 may be designed to additionally correct for other forms of optical aberration. In some embodiments, one or more of the optical elements within pancake lens block 102 may have one or more coatings, such as anti-reflective coatings, for example, to reduce ghost images and to enhance contrast in the pancake lens block 102.

Back optical element 106 may include a first compound retarder 130 and a mirrored surface 132 (also referred to as partial reflector herein). In this example, first compound retarder 130 may include QWPs (e.g., three QWPs) that transform the polarization of received light. The first compound retarder 130 may have a compound optic axis oriented at approximately 45 degrees relative to incident linearly polarized light (e.g., from the electronic display 108 and/or from a linear polarizer associated with the electronic display 108) such that first compound retarder 130 converts linearly polarized light into circularly polarized light. As noted, the first compound retarder 130 may include multiple retarders, such as QWPs. In at least one embodiment, QWPs may be made of birefringent materials such as quartz, organic stretched material sheets, or liquid crystal. In one embodiment, the QWPs may be designed to be optimized such that the dependence of the retardance induced by a given retarder remains close to a quarter of a wave independently of the wavelength and the angle of incidence on the QWP.

In some embodiments, the compound retarders (e.g., first compound retarder 130 and second compound retarder 140, to be discussed below) may include three QWPs. The first two QWPs (with respect to the display side) of the compound retarders may collectively act as a half-wave (HW) retarder of light incident on the third QWP of the compound retarders. In some embodiments, such an arrangement may ensure a match between the center wavelength of the HW retarder and the QWP retarder. In some embodiments, a pancake lens configuration whereby the first two QWPs together act as a HW retarder to the third QWP in each compound retarder may be referred to herein as a HW-compensated QWP. Specifically, the chromatic HW retarder may pre-disperse the state of polarization (SOP) of the incident light, and the third QWP (e.g., chromatic QWP) may subsequently transform the light having a range of wavelengths to a common circular SOP. In at least one embodiment, the HWs (including two QWPs) of the compound retarder may serve to pre-disperse the polarization state of the light, while the third QWP of each compound retarder may further tune the polarization.

In some embodiments, a given, single chromatic QWP may convert linearly polarized light to circularly polarized light at a pre-determined (e.g., designed) quarter wavelength. For example, such a QWP may be configured to convert predominantly green light from linear polarization to circular polarization. However, the same QWP may not be able to effectively convert predominantly red light from linear polarization to circular polarization while also converting the green light (as the pathlength-difference may be insufficient at longer wavelengths). Further, the same QWP may not be able to effectively convert predominantly blue light from linear polarization to circular polarization (as the pathlength difference may be excessive at shorter wavelengths). Accordingly, with a single QWP, the blue light may be overcompensated (e.g., over-retarded) by the QWP, while the red light may be undercompensated (e.g., under-retarded) by the QWP. In some embodiments, by using a chromatic HW retarder before the QWP in a compound retarder, the HW may have a compound optic axis orientation with respect to the third QWP such that the SOPs of blue light and red light are slightly elliptically polarized with the same orientation and opposite handedness (in terms of polarization state) to serve as input for a chromatic transformation of the third QW retarder.

In some embodiments, the SOP of green light (or a wavelength substantially intermediate between the blue and red wavelengths) may be substantially linear after the HW retarder. The three-layer configuration may transform light at two wavelengths (e.g., blue and red) to a circular SOP, versus a single QWP, which may optimally transform light of a single wavelength. In some embodiments, the optical axes of the compound retarder (e.g., the angles of the QWPs) may determine the wavelength separation between these two wavelengths, and therefore the extent of deviation from circular polarization at intermediate wavelengths between the two wavelengths. Therefore, the compound retarder may be used to convert broadband linearly polarized light (e.g., visible light including red, green, and blue light) to circular polarization, and thus serve as an achromatic compound retarder. In some embodiments, the HW (including two separate QWPs) may have double the magnitude of retardance of the third QWP in each compound retarder.

In at least one embodiment, mirrored surface 132 (also referred to herein as a partial reflector) may be partially reflective to reflect a portion of the received light. In some embodiments, mirrored surface 132 may be configured to transmit approximately 50% of incident light and reflect approximately 50% of incident light. In some instances this relationship may be substantially preserved over the visible spectrum.

Front optical element 104 may include a second compound retarder 140 and a reflective polarizer 142. The second compound retarder 140 may also include individual retarders such as QWPs (e.g., three QWPs). The reflective polarizer 142 may represent a polarization-sensitive, partially reflective mirror configured to reflect received light of a first linear polarization and transmit received light of a second linear polarization. For example, reflective polarizer 142 may be a wire grid polarizer configured to reflect linearly polarized light with a polarization direction in the x-direction, and pass light that is linearly polarized in the y-direction. The reflective polarizer 142 may further include a stretched multi-layer extruded polymer stack, such as the 3M reflective polarizer product.

Although shown as surfaces of front optical element 104 and back optical element 106 respectively, first compound retarder 130 and second compound retarder 140 may be separate from front optical element 104 and back optical element 106 in some embodiments. For example, first compound retarder 130 may be located between mirrored surface 132 and electronic display 108 (e.g., as a freestanding element in air, laminated on the surface of electronic display 108, etc.) and second compound retarder 140 may also be similarly located anywhere between mirrored surface 132 and reflective polarizer 142. Further, although shown as curved, the individual optical elements that together compose front optical element 104 and back optical element 106 in FIG. 1 may be flat or be a mix of flat and curved elements when separately provided. For example, as separate elements, first compound retarder 130 and second compound retarder 140 could be provided flat while mirrored surface 132 and reflective polarizer 142 are curved, among other variations. In one embodiment, first compound retarder 130 and second compound retarder 140 may have a cylindrical shape.

In some embodiments, the pancake lens block 102 may serve to mitigate optical aberration in an optical system. Field curvature may refer to an optical aberration that causes a flat object to appear sharp only in certain parts of the frame, instead of being uniformly sharp across the frame. More generally, field curvature may result from a focal distance of an optical system not perfectly aligning with all of the points on a focal plane. Pupil swim may refer to an effect caused by changes in the location of a user's eye within an eyebox that result in distortions in the content being presented to the user. Correcting for field curvature may mitigate pupil swim. In some embodiments, the pancake lens may mitigate field curvature in an image that is output to a user's eyes to reduce pupil swim. Additionally, pancake lens block 102 may have a small form factor, may be relatively low weight compared to other optical systems designed to remove field curvature, and/or may be configured to have a wide field of view. The operation of pancake lens block 102 is discussed below with respect to FIG. 2.

Figure 2:
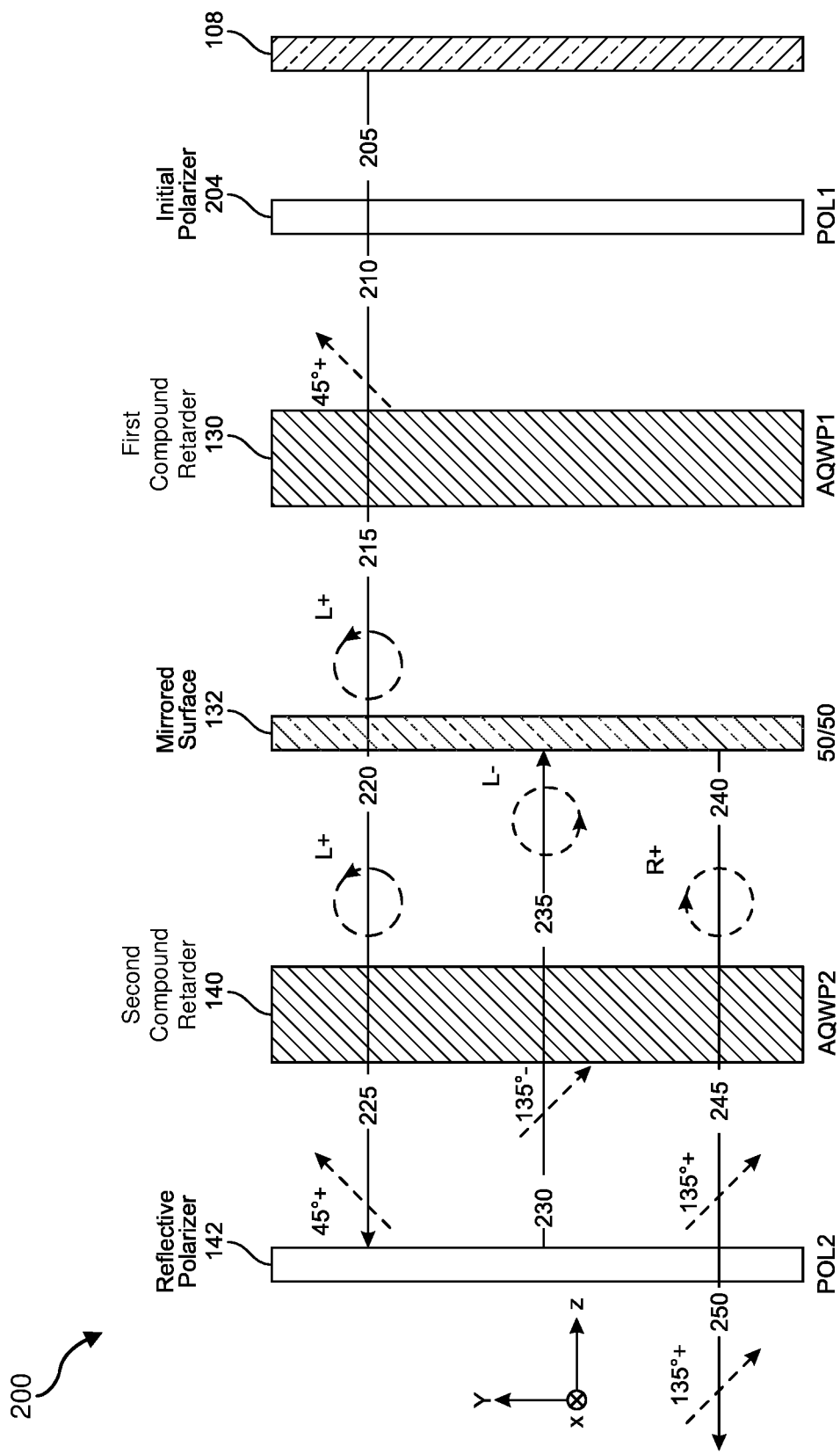
FIG. 2 shows a folded optical path with example polarization states of a pancake lens block, in accordance with one embodiment.

FIG. 2 shows a folded optical path of pancake lens block 102 in accordance with one embodiment. Light 205 from electronic display screen 108 may be initially polarized via initial polarizer 204 (POL1) to linearly polarized light 210. In some embodiments, the light emitted by the display may be already linearly polarized, in which case POL1 may not be needed. First compound retarder 130 may include an achromatic QWP (AQWP1) (e.g., including three QWPs, where the first two QWPs together serve as a HW to the third QWP, as described above) with a compound optical axis that is approximately 45 degrees relative to the direction of polarization of polarized light 210. The orientation of a compound retarder's optical axis relative to incident linearly polarized light may control the handedness and polarization ellipticity of the transmitted circularly polarized light. AQWP1 may change the polarization of light 210 from linear polarization to circular polarization for a given center wavelength and a given angle (e.g., normal incidence), which is shown as light 215. The polarization of light 215 may be clockwise or anti-clockwise based on the orientation of the axis of AQWP1 relative to incident linearly polarized light 210.

A first portion of light 215 may be reflected by mirrored surface 132 (also referred to as a partial reflector herein), and a second portion of light 215 may be transmitted by mirrored surface 132 as light 220 towards second compound retarder 140. In some embodiments, mirrored surface 132 may be configured to reflect approximately 50% of incident light (e.g., the light 215). Second compound retarder 140 may include an achromatic QWP (AQWP2) (e.g., also including three QWPs, where the first two QWPs together serve as a HW to the third QWP, as described above) and may change the polarization of light 220 from circular to linear (with light passing through AQWP2 referred to as light 225). In this arrangement, light first encounters a QW, then the HW per the "reverse order" architecture to restore the SOP. Light 225 may be incident on reflective polarizer 142 (POL2), which reflects light that is polarized in a blocking/reflecting direction (e.g., an x direction) and transmits light that is polarized in a perpendicular direction (e.g., a y direction). At this point, light 225 may be linearly polarized in the blocking direction. Thus, POL2 may reflect incident light 225 and the reflected light may be referred to as light 230. Accordingly, light 230 is again incident on AQWP2, which changes the linearly polarized light 230 to circularly polarized light 235. Further, mirrored surface 132 may reflect a portion of the polarized light 235, as described above. The reflected portion of light 235 may be referred to as light 240.

Light 240 may also be circularly polarized; however, the handedness of light 240 may be opposite to the handedness of light 235 and light 220 due to the reflection from mirrored surface 132. Thus, AQWP2 may change the polarization of circularly polarized light 240 to linearly polarized light 245. However, as the handedness of light 240 may be opposite to that of light 220, the polarization of light 245 exiting AQWP2 may be perpendicular to that of light 225. Accordingly, light 245 may be linearly polarized in a direction (e.g., y) perpendicular to the blocking direction (e.g., x) of POL2 and may therefore be transmitted by POL2 as light 250.

The process described above, however, may undergo various transformations resulting from imperfections in one or more optical elements. There may, for example, be other light paths in pancake lens block 102 due to imperfections in pancake lens block 102, and these imperfections may cause light leakage, ghost images, and the like. In particular, the wavelength of light may vary (e.g., over the visible spectrum), and a retardance of single QWPs may be a function of wavelength (and may vary with wavelength). Accordingly, a conventional (non-achromatic) QWP (e.g., not the compound retarders disclosed herein) may not be able to provide a quarter-wave retardance over the range of wavelengths of light falling incident thereon.

For example, if AQWP1 were not achromatic (e.g., referred to as QWP1), and were to produce elliptically polarized light instead of circularly polarized light, QWP2 (a non-achromatic version of AQWP2) would transmit elliptically polarized light instead of linearly polarized light. Accordingly, if the SOP of the elliptically polarized light is not restored to the input linear state, at least some light 225 may leak through POL2 in the first see-through path (and lead to artifacts called see-through ghosts) rather than reflect from POL2, as described above. Any leakage of light may be a problem, for example, when using a broadband light source, such as a color display with common chromatic QWPs (e.g., a quarter-wave plate providing quarter-wave retardance for light propagating in a specific direction at a specific wavelength). When light with a wavelength outside of the designed wavelength (and/or outside of the designed incident angle) propagates through a chromatic QWP, the polarization of the output light may be altered from the designed polarization state(s) shown in FIG. 2. Accordingly, the restoration of the input polarization of linear light may be accomplished with any combination of retarder stacks that restores the input SOP (i.e., ROC), so in such an architecture, there may not be a polarization requirement at the mid-point of the optical system.

Figure 3A:
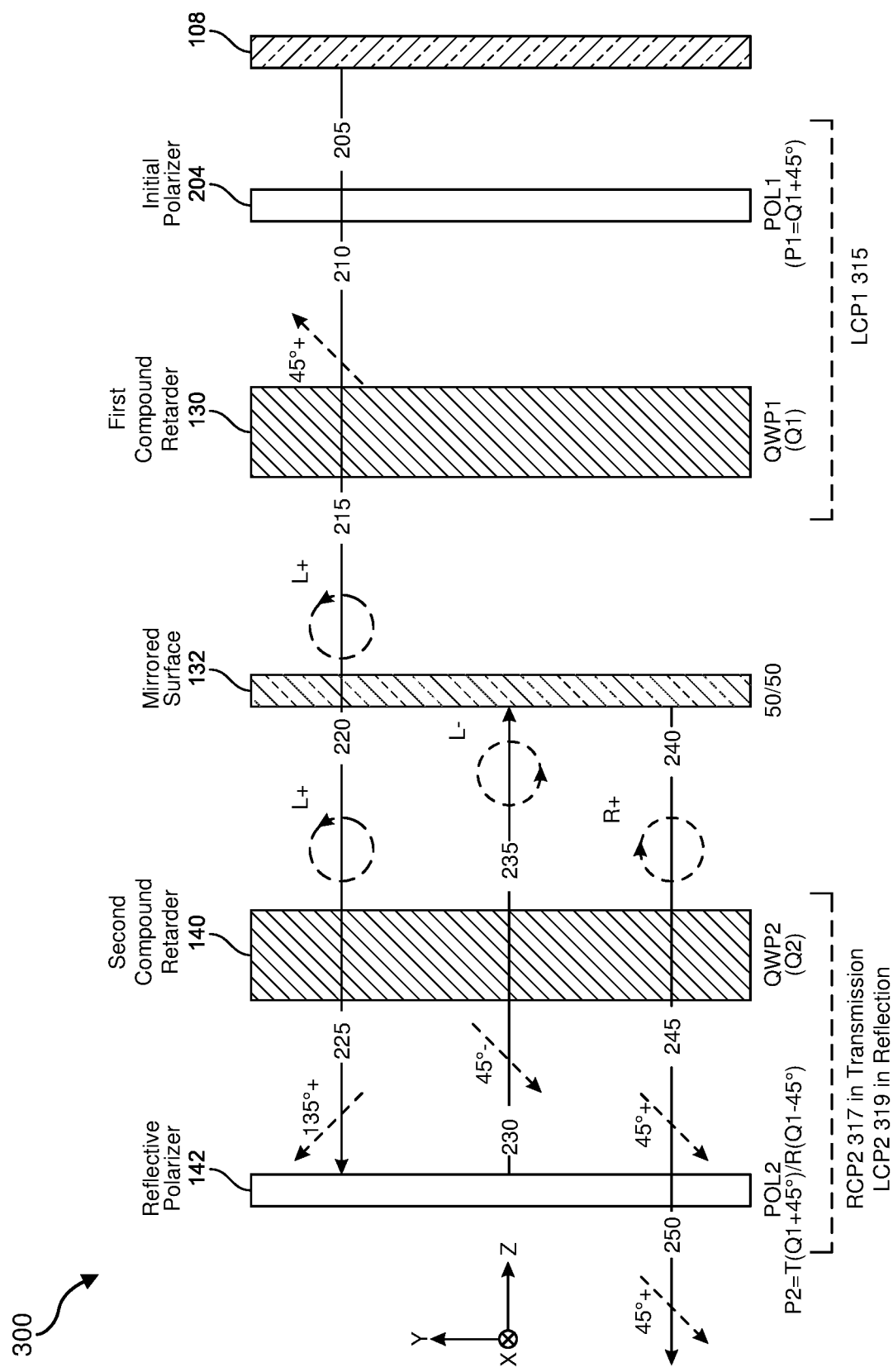
FIG. 3A shows an exemplary pancake lens block with polarizing elements that have no orientation specification between the display polarizing components and the pancake lens block polarizing components, in accordance with one embodiment.

FIG. 3A shows a pancake lens block with polarizing elements that have no orientation specification between the display polarizing components and the pancake lens block polarizing components, in accordance with one embodiment. In particular, FIG. 3A shows a pancake lens block 300 where no specific requirement has been imposed on the relative orientation between the optical element combination including a QWP2 (including a single QWP, which is not achromatic, and part of the second compound retarder 140) and a POL2 (part of reflective polarizer 142), and the optical element combination including a QWP1 (including a single QWP, which is not achromatic, and part of first compound retarder 130) and a POL1 (part of initial polarizer 204). Accordingly, POL1 and QWP1 together effectively operate as a left circular polarizer (LCP1) 315 passing left circularly polarized light. Further, QWP2 and POL2 together effectively operate as a right circular polarizer (RCP2) 317 passing right circularly polarized light in transmission and as a left circular polarizer (LCP2) 319 passing left circularly polarized light in reflection. Accordingly, the polarized light between QWP1 and QWP2 may be circularly polarized. The configuration 300 shown in FIG. 3A may work for any value of Q2, as long as P1 is ±45 degrees relative to Q1 and P2 is ±45 degrees relative to Q2, where P1, P2, Q1, and Q2 denote the optical axis values of POL1, POL2, QWP1, and QWP2, respectively. Here, QWP1 may produce circularly polarized light for a specific wavelength at a specific incidence angle.

FIG. 3B shows an exemplary pancake lens block configuration 301 (aligned to produce the most polarization leakage with wavelength and ray angle) that blocks light during a first see-through path at the designed wavelength (so both compound retarders act as quarter-waveplates), in accordance with one embodiment. As noted, QWP1 may produce circularly polarized light for a specific wavelength at a specific incidence angle. In general, as shown FIG. 3B, this circularly polarized light may be blocked 143 by QWP2 and POL2 optical element combination, regardless of the orientation of Q2, as long as Q2 is orientated 45 degrees relative to P2.

FIG. 3C shows an exemplary pancake lens block configuration 303 (aligned to produce the most polarization leakage with wavelength and ray angle) that leaks light during a first see-through path for light of non-designated wavelengths (so both compound retarders do not act as quarter-waveplates), in accordance with one embodiment. Accordingly, as illustrated in FIG. 3C, since the QWP1 and QWP2 do not provide a quarter-wave retardance for other wavelengths and/or other incidence angles, light with a different wavelength and/or a different incidence angle may leak through 144. For example, as shown in FIG. 3C, QWP2 may transmit elliptically polarized light instead of linearly polarized light, a portion of which may be leaked by 142.

Accordingly, one way to reduce leakage is by fixing the relative orientation between the compound optical axis values Q1 and Q2. Rather than aligning QWP1 with QWP2, which effectively results in a half-wave plate that rotates 45 degrees linearly polarized incident light to 135 degrees linearly polarized light, as shown in FIG. 3A, QWP2 may have an optical axis that is oriented orthogonal to QWP1, as shown in FIG. 4.

Figure 4:
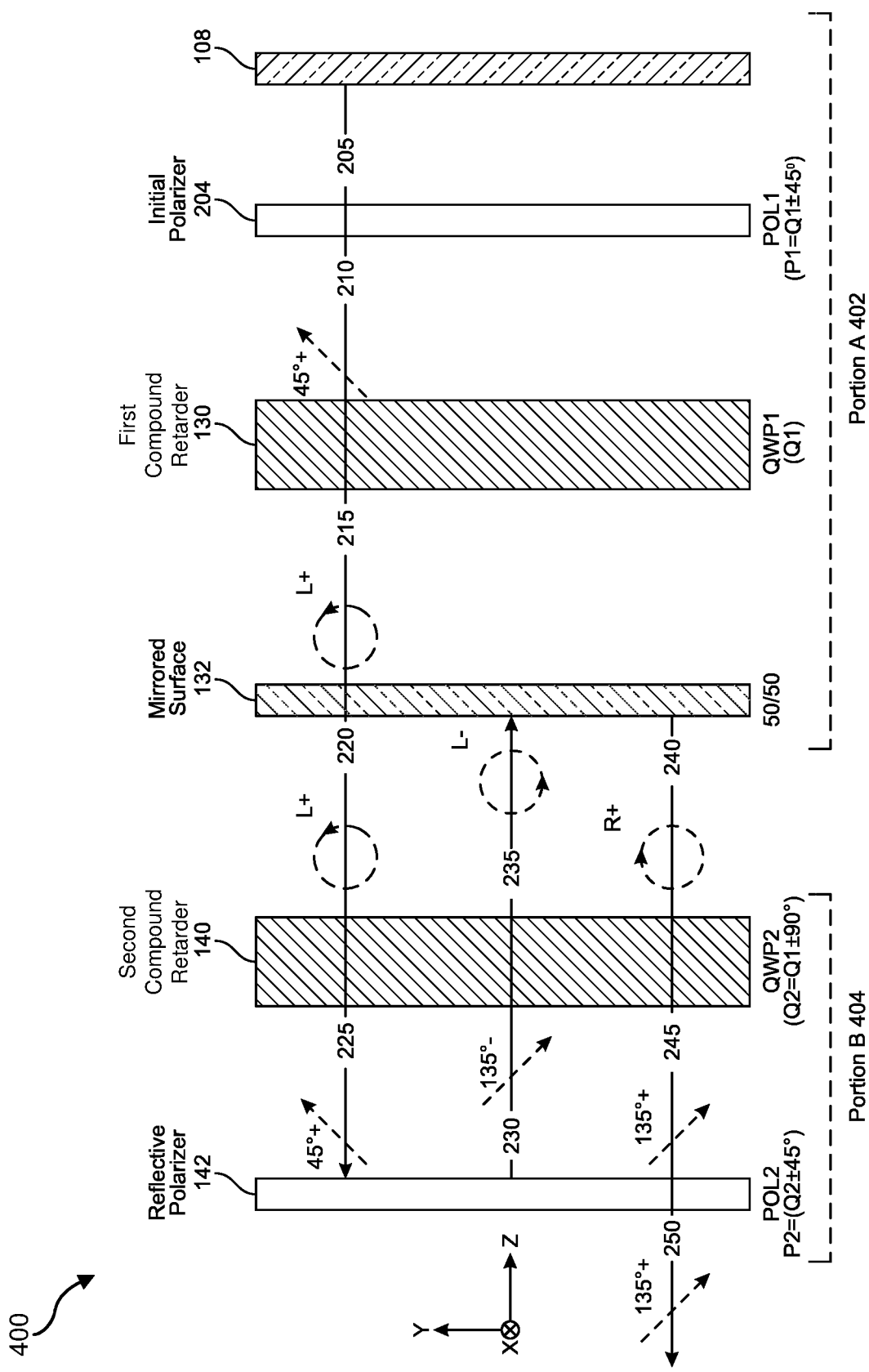
FIG. 4 shows an exemplary pancake lens block with polarizing elements that have an orthogonal orientation relative to each other, in accordance with one embodiment.

FIG. 4 shows an exemplary pancake lens block with polarizing elements that have an orthogonal orientation relative to each other, in accordance with one embodiment. In particular, diagram 400 shows a portion A 402 of the pancake lens block including POL1, QWP1, and mirrored surface 132 (which may be a partial reflector). Further, diagram 400 shows a portion B 404 of the pancake lens block including QWP2 and POL2. In this configuration, QWP2 of portion B 404 may undo the retardance induced by QWP1 of portion A 402 and, thereby, return the 45 degrees linearly polarized incident light on QWP1 back to 45 degrees linearly polarized light for a broadband spectrum of wavelengths. This fixed linearly polarized light at 45 degrees may then be reflected by POL2, and the light leakage may be substantially reduced for a broad spectrum of wavelengths. More precisely, LCP1 315 and RCP2 317 (shown and described in connection with FIG. 3A, above) may be "crossed" (e.g., have optical axes values that are different by 90 degrees, that is orthogonal to one another) in transmission for a broad range of wavelengths (e.g., wavelengths spanning the visible range).

A further explanation for the crossed configuration of the LCP1 315 and RCP2 317 (shown and described in connection with FIG. 3A, above) may be described with reference to FIG. 5 and FIG. 6. In particular, a given compound retarder (i.e., QWP1 or QWP, shown and described in connection with FIG. 3A) may be represented by a vector including two optical properties: a retardance magnitude (e.g., a quarter-wavelength, in this example) and an optical axis orientation (e.g., angle).

Figure 5:
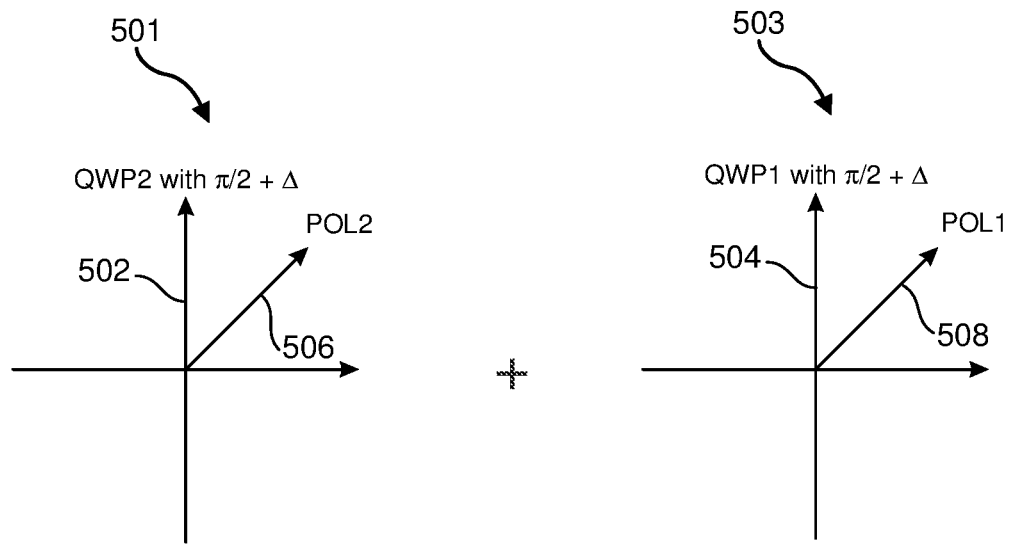
FIG. 5 shows the polarization orientation of an exemplary pancake lens block with polarizing elements that have an orientation specification that produces polarization leakage with wavelength and ray angle, in accordance with one embodiment.

FIG. 5 shows the polarization orientation of a pancake lens block with polarizing elements that have an orientation specification that produces the most polarization leakage with wavelength and ray angle, in accordance with one embodiment. As shown in FIG. 5, if the optical axis 502 of QWP2 as represented by diagram 501 is parallel to the optical axis 504 of QWP1 as represented by diagram 503, the retardance of the QWPs may be effectively additive (e.g., the polarization vector 506 for QWP2 and the polarization vector 508 for QWP1 are additive), and a spectral dispersion effect on light propagating through the QWPs increases. The light leakage of such imperfect QWPs in pancake lens block 102 may thus be proportional to $\cos^2(\pi/2+\Delta)$, where $\pi/2$ is included to capture the retardance magnitude of the quarter-wave and A is a retardance error of QWP1 and QWP2. For example, a 15 degrees retardance error for A may result in a light leakage of approximately 6.7% through the pancake lens block 102 (see FIG. 1), for example, which may degrade image contrast and lead to the formation of ghost images in optical systems using the pancake lens block.

Figure 6:
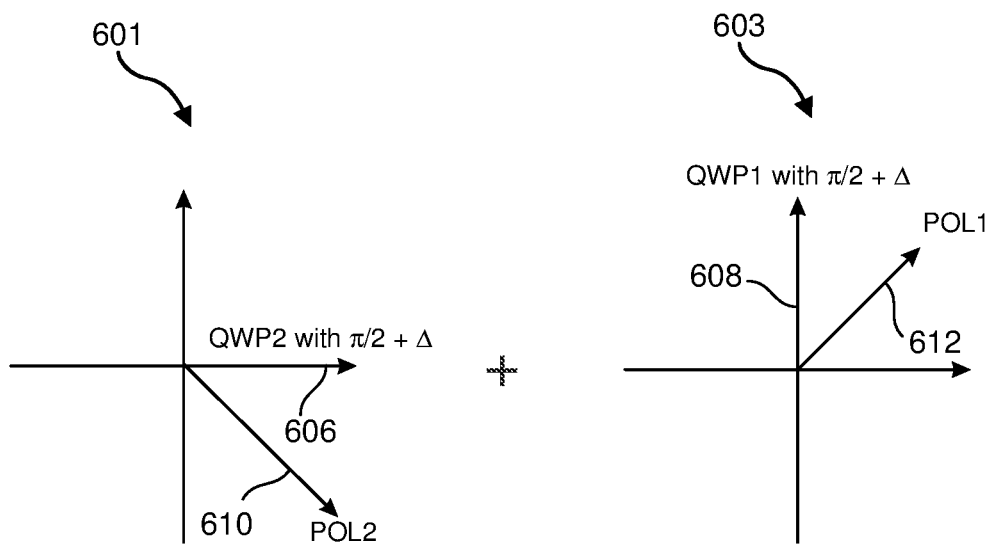
FIG. 6 shows the polarization orientation of an exemplary pancake lens block with polarizing elements that have an orthogonal orientation relative to each other that produces the polarization leakage with wavelength and ray angle, in accordance with one embodiment.

FIG. 6 shows the polarization orientation of a pancake lens block with polarizing elements that have an orthogonal orientation relative to each other that produces the least polarization leakage with wavelength and ray angle, in accordance with one embodiment. Referring to FIG. 6, if the optical axis 606 for QWP2 as represented by diagram 601 is set orthogonal to the optical axis 608 of QWP1 as represented by diagram 603, the vectors representing the magnitudes of the retardance and the optical axes of the compound retarders may subtract (e.g., the polarization vector 610 for QWP2 and the polarization vector 612 for QWP1 are subtractive), and a spectral dispersion effect on light propagating through the QWPs may decrease. The subtraction of the vectors may effectively cancel the retardance error A of both QWP1 and QWP2. Thus, the optical aberrations of the combined QWPs in this arrangement may effectively be zeroed out. Accordingly, the transmitted linearly polarized light from QWP2 (e.g., light 250 shown in connection with FIG. 3A and described in connection with FIG. 2) may be the same as the linearly polarized light incident on QWP1 (e.g., light 210 shown in connection with FIG. 3A and described in connection with FIG. 2). Moreover, since the transmission axis of POL2 is orthogonal to POL1, the transmitted linearly polarized light from QWP2 may not transmit through POL2.

In some embodiments, the ROC-based pancake lens optical system described herein may use an optical cavity (e.g., an air gap or a gap filled with a material such as a nanovoided material between the second compound retarder and the reflective polarizer) to fold the path of propagating light through the pancake lens block. Accordingly, as discussed further in connection with FIG. 7A below, a distance (e.g., distance 713 in FIG. 7A) may define a gap or cavity in the pancake lens block, and a surface of the reflective polarizer (e.g., a shaped reflective polarizer 714 in FIG. 7A) may face this optical cavity. Further, shaping (e.g., imparting curvature to) the reflective polarizer while maintaining the reflective polarizer's optical quality and polarization efficiency may enable more compact designs for the pancake lens.

In some embodiments, the reflective polarizer may include a flat reflective polarizer (e.g., for larger optical systems), a thermoformed (e.g., vacuum-formed) reflective polarizer, a cold-formed reflective polarizer, or a wiregrid reflective polarizer (including a wiregrid polarizer having a conformal deposition), and the like. In another embodiment, the amount of shaping and/or other processing parameters used to make the reflective polarizer may be within specified ranges such that resulting geometric distortions to the reflective polarizer's physical structure may not be significant enough to damage the reflective polarizer or diminish the reflective polarizer's functionality. In another embodiment, the shaped reflective polarizer may be tested to ensure that it maintains a suitable extinction ratio (e.g., an extinction ratio, defined below, above a predetermined threshold) for incident collimated light as compared with a non-shaped reflective polarizer. In one aspect, the shaped reflective polarizer may include a relatively low mechanical-stress reflective polarizer (e.g., cylindrical reflective polarizers) having one axis of curvature. In another embodiment, the shaped reflective polarizer may include reflective polarizers having compound curvature.

In one embodiment, the polarizing properties of a reflective polarizer may be defined by the extinction ratio, $\rho_p$, of the reflective polarizer. In particular, given that the principal transmittances of the reflective polarizer are $T_1$ and $T_2$, $T_1$ may represent the maximum transmission of the reflective polarizer occurring when the axis of the reflective polarizer is parallel to the plane of polarization of the incident polarized beam, while $T_2$ may represent the minimum transmission of the reflective polarizer occurring when the axis of the polarizer is perpendicular to the plane of polarization of the incident polarized beam. In that case, the extinction ratio may be given by $\rho_p=T_2/T_1$. Further the extinction performance of the reflective polarizer may be expressed as a contrast $1/\rho_p$: 1. In another embodiment, the extinction ratio of a polarizer may range from less than 100:1 to approximately $10^6$:1 (e.g., similar to the extinction ratio of birefringent crystalline polarizers). As noted, a planar reflective polarizer may have a predetermined extinction ratio that may be maintained within a certain range of tolerance after being shaped.

In various embodiments, the inclusion of the shaped reflective polarizer in the ROC pancake lens block may provide optical power and may enable more compact designs while maintaining optical quality, high contrast, and polarization efficiency. Further, given that reflective polarizers have mirror functionality, the reflective power of the reflective polarizer may be achromatic and may therefore not add significant optical aberrations to the pancake lens block (e.g., in comparison with refractive lenses).

In some embodiments, aspects of manufacturing a shaped wiregrid polarizer are disclosed. In some embodiments, the wiregrid components (also referred to simply as wiregrids herein) of a wiregrid polarizer may be fragile, with individual wires having nanometer dimensions. Accordingly, it may be easy to break or distort the wiregrids and thereby lose or reduce the polarization effect of the wiregrids. It may therefore require procedures (as described herein) to shape a reflective polarizer that includes wiregrid elements without distorting the polarization effect of the reflective polarizer. Further, the wiregrids in a wiregrid polarizer may either be exposed to air to increase the polarization efficiency of the wiregrid polarizer (in which case, the wiregrids may be more fragile) or the wiregrids may be embedded within a material (e.g., a resin).

In some embodiments, shaping a wiregrid reflective polarizer film in one axis (e.g., cylindrically) may be less complex than shaping a wiregrid reflective polarizer film in two axes (e.g., introducing compound curvature to the wiregrid reflective polarizer film). That is, shaping a wiregrid reflective polarizer film in one axis without causing the wiregrid reflective polarizer film to buckle may not be as difficult as shaping a wiregrid reflective polarizer film in two axes (e.g., having the wiregrid reflective polarizer film initially as a square shape and shaping it into a semispherical shape having compound curvature). For example, in the two-axes configuration, the wiregrid reflective polarizer film may buckle during a formation process (e.g., a thermoforming formation process). Accordingly, the wiregrid reflective polarizer film may be first disposed on a more rigid substrate (also referred to as a bolstering substrate herein) that is more resistant to buckling, prior to laminating the wiregrid reflective polarizer film onto a curved surface (e.g., a surface of a reflective mirror element having compound curvature). In some embodiments, such a bolstering substrate coupled to a reflective polarizer film may need to be designed to counteract the tendency for the bolstering substrate to stretch the reflective polarizer film, which may introduce optical distortions (e.g., reduced contrast, reduced extinction coefficient, and the like) and may affect the polarization state of light reflected from the reflective polarizer.

Figure 7A:
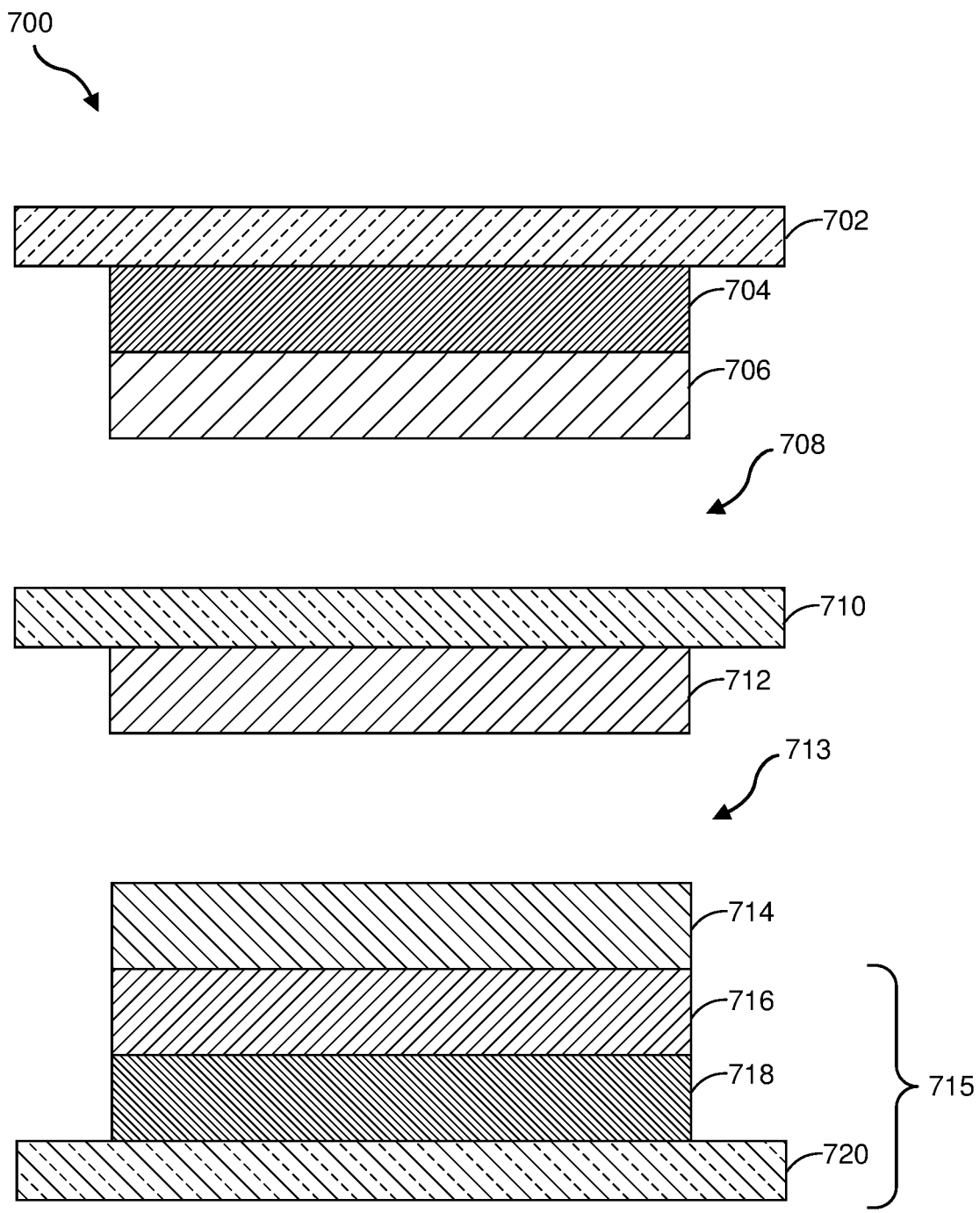
FIG. 7A shows an example diagram of a portion of a pancake lens block including a shaped reflective polarizer, in accordance with example embodiments of the disclosure.

FIG. 7A shows an example diagram 700 of a portion of an ROC-based pancake lens block including a shaped reflective polarizer, in accordance with example embodiments of the disclosure. In some embodiments, the diagram 700 shows a display 702 followed by a linear polarizer 704, a first compound retarder 706, a partial reflector 710, a second compound retarder 712, and a shaped reflective polarizer 714 (shown here as a planar element for ease of representation, but which way be shaped as further shown and described in connection with FIGS. 8 and 9, below). In one aspect, diagram 700 further shows an optional eye-reflection portion 715 that serves to reduce back reflections emanating from a user's eye. In particular, the eye-reflection portion 715 may include a polarizer 716, a third compound retarder 718, and an anti-reflective material 720 (e.g., a shaped antireflective lens). In one aspect, a first distance 708 may define a cavity (e.g., a cavity that may be filled with air or a material such as a nanovoided material) between the first compound retarder 706 and the partial reflector 710. In some embodiments, a second distance 713 may define another cavity (e.g., a cavity that may be filled with air or a material such as a nanovoided material) between the second compound retarder 712 and the shaped reflective polarizer 714.

In some embodiments, light may enter the cavity defined by the second distance 713 from the partial reflector 710 and may propagate through the second compound retarder 712 and exit the optical cavity to propagate towards the shaped reflective polarizer 714 (e.g., a shaped wiregrid polarizer). In some embodiments, the wires of the shaped reflective polarizer 714 (e.g., wiregrid polarizer) may be positioned after the optical cavity, as will be further described in connection with FIG. 9, below. Accordingly, the wires of the wiregrids of the shaped reflective polarizer 714 may face the cavity-side (e.g., facing the second distance 713 defining the cavity), as will be shown and described further in connection with FIG. 9, below. In some embodiments, the wires of the wiregrids of the shaped reflective polarizer 714 may be coupled to a wiregrid polarizer substrate (not shown). In at least one aspect, the wiregrid polarizer substrate may include a tri-acetyl cellulose (TAC) substrate. In other embodiments, the wiregrid polarizer substrate may include, a polyolefin-based resin such as polypropylene, polymethylpentene, and a cyclic olefin-based polymer (e.g. norbornene-based resins, triacetyl cellulose, polyethylene terephthalate, polycarbonate resin, polyethylene naphthalate, polyurethane, polyether ketone, polysulfone, polyether sulfone, polyester, polystyrene-based resin, and/or acrylic-based resin).

Further, the shaped reflective polarizer 714 may include a wiregrid polarizer substrate that may be coupled to a bolstering substrate (not shown), which may be coupled to the wiregrid polarizer substrate. Further, the bolstering substrate may include a TAC material, and may be configured to be a thicker TAC layer than the TAC substrate of the wiregrid polarizer substrate. In other embodiments, the bolstering substrate may include, a polyolefin-based resin such as polypropylene, polymethylpentene, and a cyclic olefin-based polymer (e.g. norbornene-based resins, triacetyl cellulose, polyethylene terephthalate, polycarbonate resin, polyethylene naphthalate, polyurethane, polyether ketone, polysulfone, polyether sulfone, polyester, polystyrene-based resin, and/or acrylic-based resin).

As noted, in some embodiments, a second compound retarder (e.g., second compound retarder 712) of the pancake lens block may be physically separated from the reflective polarizer (e.g., shaped reflective polarizer 714) by a distance (e.g., second distance 713) defining a gap (e.g., a gap filled with air or another material, such as a nanovoided material, to be described herein). Accordingly, the second compound retarder may not need to be shaped to conform to the shape of the shaped reflective polarizer. Furthermore, separating the second compound retarder from the polarizer by a distance (e.g., second distance 713), so that the second compound retarder does not itself need to be shaped, may enable a fabrication process for the reflective polarizer that may be directed to the geometric, thermal, and polarization design considerations of the reflective polarizer itself without implicating additional constraints imposed by the second compound retarder. This may allow for the design of optical system implementing the pancake lens block to maintain relatively high levels of contrast without impacting the properties of the second compound retarder.

As noted, the distances included in the pancake lens block of diagram 700 defining a cavity or gap (e.g., cavity associated with the first distance 708 or second distance 713) may include air or any other suitable material, including a nanovoided material (e.g., a material having a plurality of voids and/or nano-sized voids in the material), having a predetermined density of nanovoids that have an associated a refractive index that may be tuned. In some embodiments, the nanovoids may occupy at least approximately 10% (e.g., approximately 10% by volume, approximately 20% by volume, approximately 30% by volume, approximately 40% by volume, approximately 50% by volume, approximately 60% by volume, approximately 70% by volume, approximately 80% by volume, approximately 90% by volume) of the volume of the nanovoided material. The voids and/or nanovoids may be either closed- or open-celled, or a mixture thereof. If they are open-celled, the void size may be the minimum average diameter of the cell. In some embodiments, the nanovoided material may include a thermoset material and/or any other suitable material.

The voids and/or nanovoids may be any suitable size and, in some embodiments, the voids may approach the scale of the thickness of the nanovoided material. For example, the voids may be between approximately 10 nm to about equal to the thickness of the nanovoided material. In some embodiments, the voids may be between approximately 10 nm and approximately 1000 nm, such as between approximately 10 nm and approximately 200 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, approximately 1000 nm).

In some embodiments, the nanovoided material may be formed from curable materials (to be described below), and a first side of the nanovoided material may be deposited onto a removable substrate material. Moreover, a second, exposed side of the nanovoided material may be laminated onto a surface of a given optical element in the ROC pancake lens (e.g., a surface of the second compound retarder 712 or a surface of the reflective polarizer 720), and the removable substrate material may be removed from the first side of the nanovoided material.

Further, in terms of fabrication of the nanovoided material, a curable material (e.g., a monomer) may be deposited (e.g., vaporized by a vaporizer as part of a deposition system, for example, a thermal evaporation system) onto a removable substrate material. In some embodiments, a corresponding monomer initiator may be used for starting a chemical reaction to form the nanovoided material. In some examples, "monomer," as used herein, may refer to a monomer that forms the nanovoided material.

Moreover, the deposited curable material may be cured with a source of radiation (e.g., actinic energy) to form the polymer material. In some embodiments, the source of radiation may, for example, include an energized array of filaments that may generate actinic energy to initiate reaction between the monomer and the monomer initiator to effect polymerization of the monomer. The monomer and monomer initiator may react upon exposure to radiation from a radiation source to form a polymer element. In some examples, "actinic energy," as used herein, may refer to energy capable of breaking covalent bonds in a material. Examples may include electrons, electron beams, x-rays, gamma rays, ultraviolet, and/or visible light at appropriately high energy levels, and/or ions.

Figure 7B:
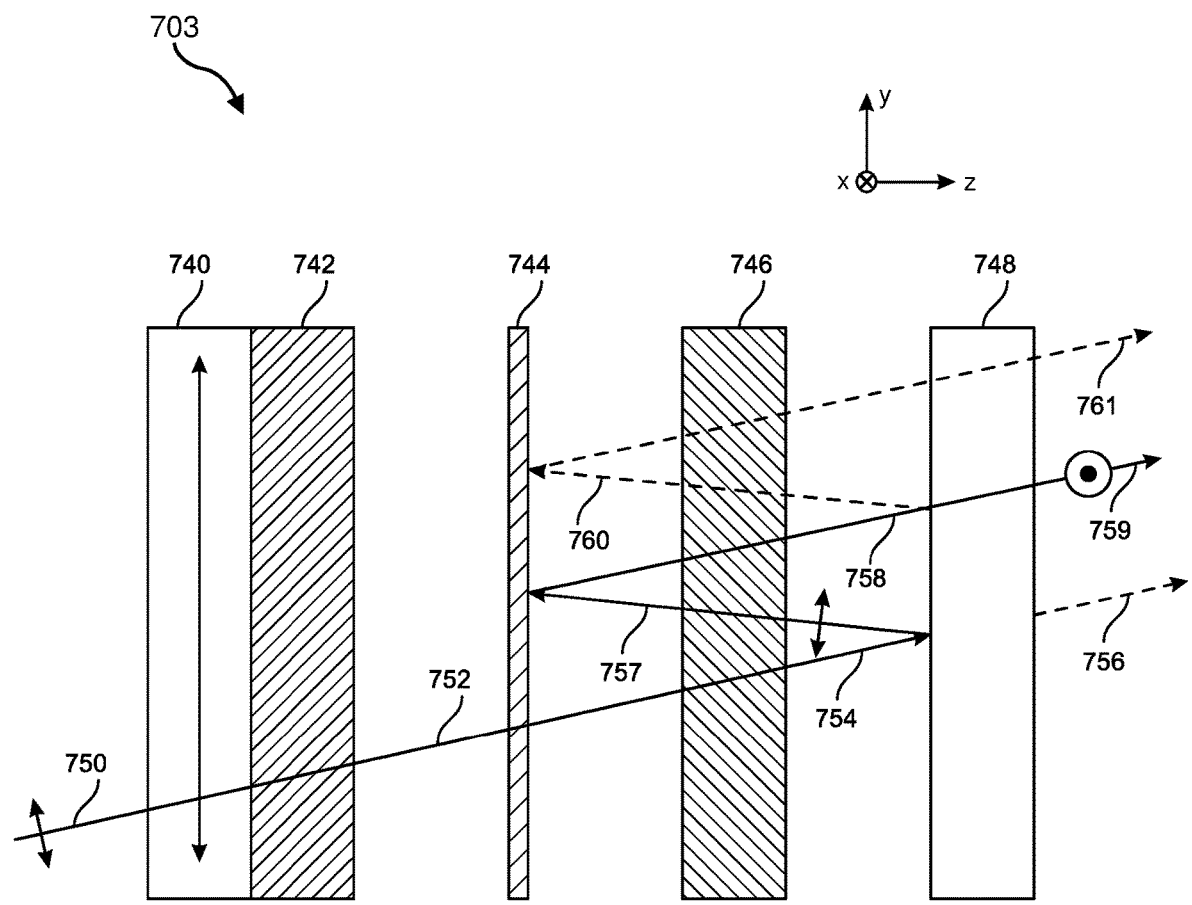
FIG. 7B shows another diagram of an example optical layout of a reverse-order crossed pancake lens block including example visual artifacts, in accordance with one embodiment.

FIG. 7B shows another view of the reverse order crossed pancake lens block and associated artifacts, in accordance with example embodiments of the disclosure. In some embodiments, diagram 703 shows a polarizer 740, a first compound retarder 742, a partial reflector 744, a second compound retarder 746, and a reflective polarizer 748, which were described above. In particular, diagram 703 shows a folded optical path of pancake lens block and the various optical artifacts associated with the pancake lens block. Light 750 (e.g., light emanating from an electronic display, not shown) may initially be polarized via polarizer 740 to linearly polarized light. In some embodiments, the light emitted by the display may be already linearly polarized, in which case the polarizer 740 may not be needed. First compound retarder 742 may be achromatic and may have a compound optical axis that is approximately 45 degrees relative to the direction of polarization of light from the polarizer 740. The orientation of the compound optical axis of first compound retarder 742 relative to incident linearly polarized light may control the handedness and polarization ellipticity of the transmitted circularly polarized light 752. The compound retarder 742 may change the polarization of light 750 from linear polarization to circular polarization for a given center wavelength and a given angle (e.g., normal incidence) or range of angles, to generate light 752. The polarization of light 752 may be clockwise or anti-clockwise based on the orientation of the axis of the first compound retarder 742 relative to incident linearly polarized light from the polarizer 740.

A portion of light 752 may be transmitted by partial reflector 744 towards second compound retarder 746. The second compound retarder 746 may be achromatic and may change the polarization of light 752 from circular to linear (referred to as light 754). Light 754 may be incident on reflective polarizer 748, which may reflect light 757 that is polarized in a blocking/reflecting direction (e.g., an x direction) and transmit light 756 that is polarized in a perpendicular direction (e.g., a y direction). This transmitted light 756 may be referred to as a see-through ghost herein and may have an intensity that may be proportional to $\cos^2(\varepsilon)$, where E refers to the projection of the incident state of polarization of light 754 onto the reflection axis of the reflective polarizer 748, in terms of power. This term captures both orientation errors and ellipticity errors resulting from improper restoration of the initial linear state. The error can result from improper matching of the two QW retarders in fabrication (e.g. even at normal incidence), distortions that can happen to the state of polarization off-normal, or some combination of the two. At this point, light 754 may be linearly polarized in the blocking/reflecting direction. Thus, the reflective polarizer 748 may reflect light 754 and the reflected light may again be incident on the second compound retarder 746, which may change the linearly polarized light to circularly polarized light 757. Further, the partial reflector 744 may reflect a portion of the polarized light 757 back through the second compound retarder 746 and the reflective polarizer 748 to yield transmitted signal image light 759, which may have an amplitude proportional to $\cos^2(\varepsilon)\cos^2(\delta)$, where $\delta$ may refer to the projection of the state-of-polarization of light 758 onto the axis orthogonal to the reflection axis of reflective polarizer 748 (i.e. the "transmission axis") after a round-trip of compound retarder 746. This error is associated with incomplete conversion of light 754 to the orthogonal linear state-of-polarization 758 due to non-ideal polarization transformation by compound retarder 746.

At this point, the reflective polarizer may again reflect a portion of light 758 proportional to $\sin^2(\delta)$ and the reflected light may again propagate through the second compound retarder 746, and the partial reflector 744 may reflect a portion of the polarized light 760 back through the second compound retarder 746 and the reflective polarizer 748 to yield transmitted light 761, which may be referred to as a double-bounce ghost light herein and may be an undesirable visual artifact in the pancake lens and which may be suppressed using the techniques described herein.

Figure 7C:
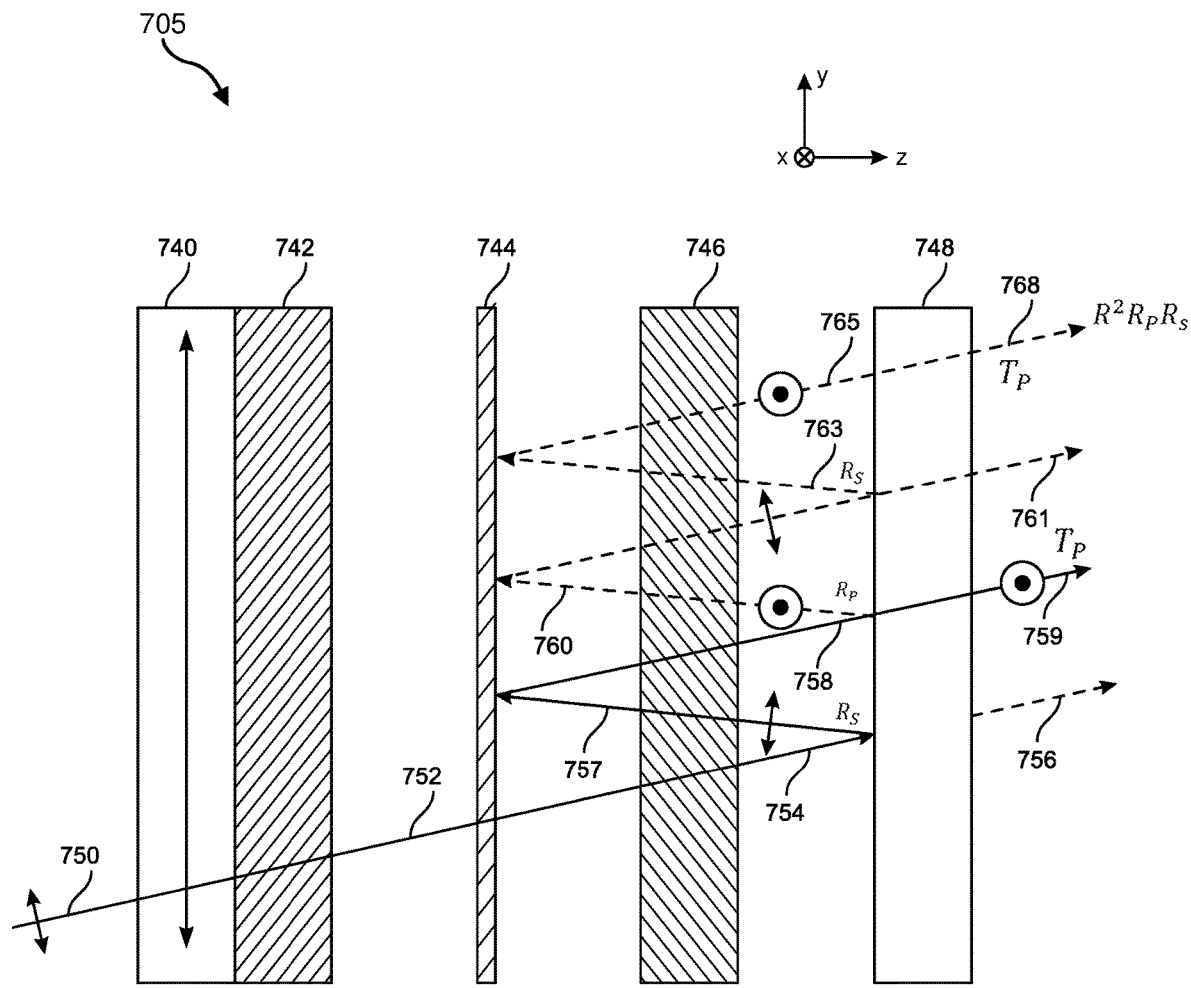
FIG. 7C shows yet another diagram of an example optical layout of a reverse-order crossed pancake lens block including example visual artifacts, in accordance with one embodiment.

FIG. 7C shows yet another diagram of an example optical layout of a reverse-order crossed pancake lens block including example visual artifacts, in accordance with one embodiment. In some aspects, while FIG. 7B showed an example second visual artifact (e.g., the double bounce ghost 761) a further artifact in the ROC pancake lens structure 705 may include a third visual artifact that can arise from the interaction of the light 750 with the reflective polarizer 748. Such a visual artifact may be referred to as a triple-bounce ghost (TPG) 768, to be discussed further below. In some aspects, the diagram 705 shows both light having both s and p polarizations. Further, the orientations for the s and p polarized light shown in diagram 705 may be different than some optics conventions (e.g., the s polarized light may typically be oriented parallel to an interface in conventional diagrams). This change of conventional notation will not affect the description of the visual artifacts and the disclosed embodiments for reducing their impact and magnitude on the ROC pancake lens and associated optical systems.

As shown in FIG. 7C, following the signal-path of light 750, light that has completed one round-trip of the cavity (e.g., light 758) may be efficiently transmitted by the reflective polarizer (e.g., light 759), with transmission proportional to $T_p$ (i.e. the transmission of p-polarized light). However, as noted, an imperfect reflective polarizer (e.g., the reflective polarizer 748) may reflect a portion of this light (e.g., light 760) back into the cavity defined by the partial reflector 744 and the second compound retarder 746, the reflective polarizer reflecting the light with reflectivity $R_p$. In some aspects, the reflected light (e.g., light 760) may be substantially converted back to s-polarization after a double-pass through the second compound retarder 746, and reflection from the partial reflector 744 (with reflectivity that may be approximately 50%). This light (e.g. light 763) may be returned to the cavity with an additional amplitude factor $R_s$. Moreover, such light may be substantially converted back to p-polarization (e.g., light 765) after a double-pass of the second compound retarder 746 and reflection from the partial reflector 744. Gathering the amplitude terms associated with reflection of the light through the pancake lens bloc, a visual artifact which may be referred to as a triple-bounce ghost 768 (associated with an imperfect reflective polarizer 748) may be transmitted with contrast (relative to the signal path) that may be proportional to $4/(R_p R_s \cos^4\delta)$, where the term $\delta$ may refer to an error in the round-trip polarization conversion as previously described.

In some aspects, an ideal reflective polarizer may have associated values of $T_p=1$, $R_s=1$, and so, for such an ideal reflective polarizer, $R_p=T_s=0$. Such an $R_p$ term and associated visual artifacts (e.g., the triple bounce ghost) may be reduced relative to the signal by either decreasing $R_p$ or decreasing the reflectivity of the reflective polarizer 748. Other mechanisms for reducing this ghost (e.g. reduced polarization conversion efficiency) tend to increase the amplitude of other ghosts. In at least one aspect, the triple bounce ghost 768 may be reduced by reducing the reflection of the p-polarized light (e.g., light 760). In some aspects, the reflective polarizer 748 may be configured to include an antireflective coating and/or an index matched layer to the reflective polarizer 748 on the surface of the reflective polarizer 748. In some aspects, such an AR coating may include an oxide, a polymer, or any other type of suitable material. Further, the AR coating may include a multi-layer coating. In at least one aspect, the AR coating may include one or more particles having a refractive index designed to tune the refractive index of the AR coating. In some embodiments, the AR coating may be disposed on the reflective polarizer 748 using any suitable method including, but not limited to, atomic layer deposition (ALD), physical vapor deposition (PVD), chemical vapor deposition (CVD), thermal evaporation, spin coating, or the like. In at least one aspect, the AR coating may have a thickness that is a quarter wavelength, a half-wavelength, a three-quarters wavelength, or any suitable multiple of the center design wavelength of the pancake lens block.

Figure 8:
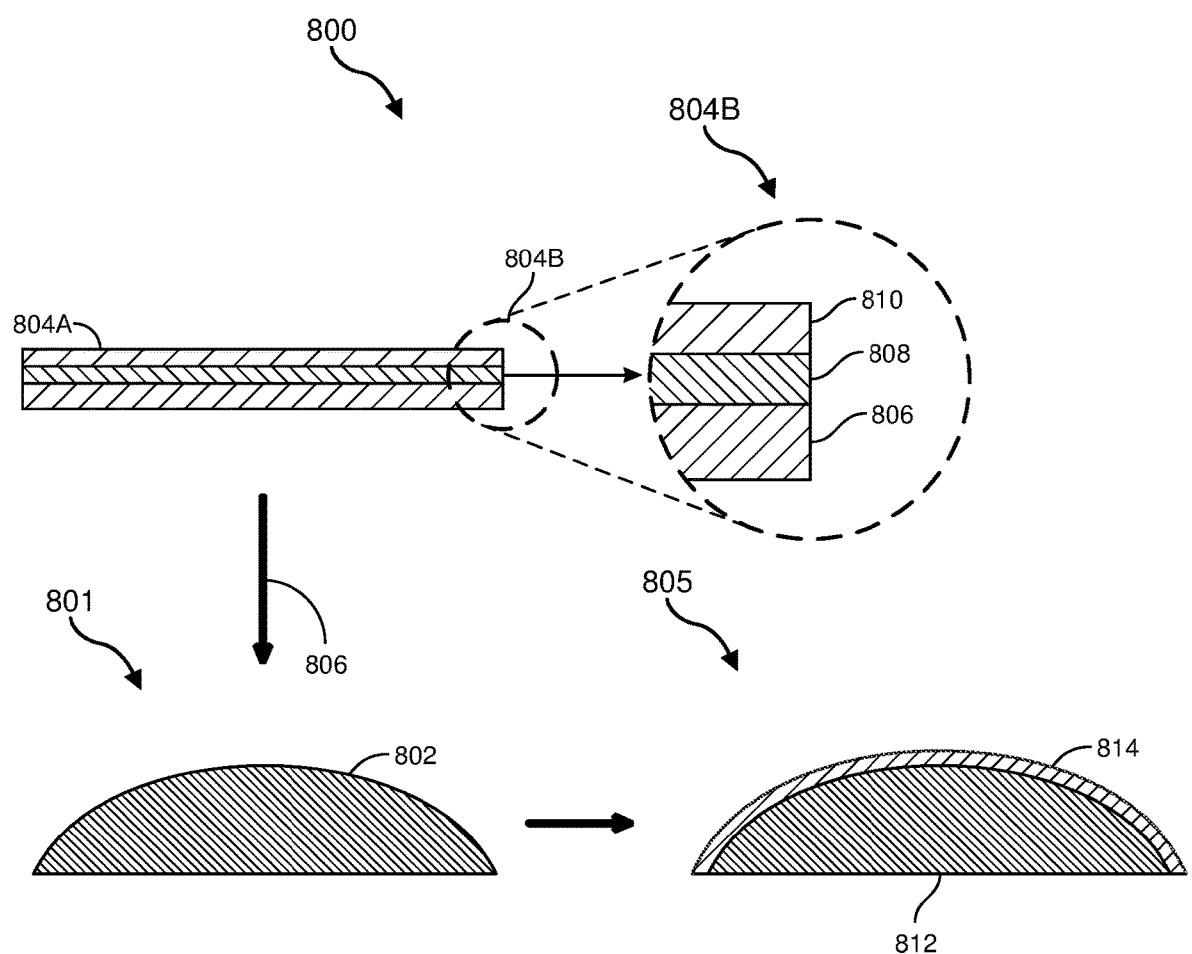
FIG. 8 shows a diagram of example operational flow for fabricating a shaped reflective polarizer, in accordance with example embodiments of the disclosure.

FIG. 8 shows a diagram illustrating example fabrication operations for fabricating a shaped reflective polarizer, in accordance with example embodiments of the disclosure. In some embodiments, as will be shown and described below, a process for manufacturing the shaped reflective polarizer having a wiregrid polarizer may include (i) providing a first structure including wires in a wiregrid polarization film (e.g., a wire supporting substrate), where the wires are oriented toward an optical cavity of the pancake lens block, (ii) providing a bolstering substrate to couple with the first structure to form a second structure, and (iii) shaping (e.g., thermoforming or laminating) the second structure onto a curved surface (e.g., a lens). These fabrication processes apply to other reflective polarizers, including, for example, the multi-layer stretched films manufactured by 3M.

In particular, diagram 800 of FIG. 8 includes a first diagram 801 illustrating a substrate 802 having a curved surface. In some embodiments, the substrate 802 may include a lens, that may refract incident light on the substrate 802. The diagram 800 further shows a planar wiregrid polarizer 804A, which may include a film of wiregrids. In at least one embodiment, the planar wiregrid polarizer 804A may include several additional layers, to be described further in connection with view 804B of the planar wiregrid polarizer 804A. In some embodiments, the planar wiregrid polarizer 804A may be laminated or molded 805 onto the substrate 802, as will be shown in connection with diagram 805.

In at least one embodiment, the substrate 802 may include any suitable materials, such as glass and/or plastic. The substrate may include a lens that is made of a crown glass material, such as a borosilicate crown glass material. In some embodiments, the crown glass may include additives such as zinc oxide, phosphorus pentoxide, barium oxide, fluorite and lanthanum oxide, which may alter the optical or mechanical properties of the lenses. In another example, the substrate may include a plastic material. For example, the substrate 802 may include a CR-39 lens material, due to its low specific gravity and low dispersion. In another example, the substrate 802 may include a polymer, such as a urethane-based polymer. In one embodiment, the substrate 802 may include a UV-blocking material, such as polycarbonate. Furthermore, the substrate 802 may include a high-refractive-index plastic, such as thiourethanes, in which sulfur content in the polymer may tune the index-of-refraction of the plastic.

As noted, when wrapping a planar element (e.g., a wiregrid polarization film) on a curved (e.g., semi-spherical) surface (e.g., a lens), there may be a mismatch of surface areas of the planar element and the curved surface (e.g., the curved element may have a different surface area than the surface area of the planar element projected onto the curved element), leading to buckling of the planar element. In particular, planar elements may have little to no points of curvature. However, by creating a fold in the plane of the planar element, a point of curvature may be added. In order to obtain an equal amount of curvature as a semi-spherical area, however, a near infinite number of folds may need to be made. In some embodiments, a bolstering material (also referred to herein as a bolstering substrate) may be used to provide a compression effect to the planar element (e.g., a wiregrid polarizer film), while simultaneously introducing curvature to the planar element. That is, by coupling the bolstering material with a strong compression effect to the planar element, the planar element may in turn be coupled to a curved surface without introducing significant buckling in the planar material. In some embodiments, the bolstering material used herein in connection with a wiregrid polarization film may include TAC or poly(methyl methacrylate) (PMMA) (e.g., CLAREX made by Astra products).

In some embodiments, when the radius of curvature of the curved surface is small, the compression forces introduced to the bolstering material by the curved surface may be small. Accordingly, the amount of bolstering material (e.g., the thickness of the bolstering material) may be dependent on the radius of curvature of the curved surface. For example, a surface of a substrate (e.g., a lens substrate) having a 30 mm radius of curvature may require approximately 300 microns of bolstering material (e.g., PMMA) to prevent buckling of the wiregrid polarizing film. In another embodiment, approximately 80 microns of PMMA may be used as the wiregrid substrate, and another 150 microns to 250 microns of PMMA may be used for the bolstering material.

In at least one embodiment, the view 804B of the planar wiregrid polarizer 804A illustrates that the planar wiregrid polarizer 804A may include a bolstering substrate 806, which, as noted, may include a TAC material or a PMMA material. In one aspect, view 804B indicates that the planar wiregrid polarizer 804A may further include a wiregrid substrate 808, which may also include a TAC material. In one aspect, the view 804B further illustrates that the planar wiregrid polarizer 804A may include a wiregrid polarizer wire layer 810, which includes the wires of the polarizer.

In some embodiments, as noted, a TAC material may be used as a bolstering substrate 806 and/or as a wiregrid substrate 808. In some embodiments, the wiregrid substrate 808 (e.g., the TAC-based wiregrid substrate) may provide approximately 40 nm of negative c-plate retardance on the output side of the polarizer. In some embodiments, a wiregrid substrate 808 other than TAC (e.g., a substrate made from a resin) may be used, which may provide mechanical support for the wires of the wiregrid polarizer film under compression.

Diagram 805 shows a view of a shaped reflective polarizer 805 including a laminated wiregrid polarizer 814. In particular, the laminated wiregrid polarizer 814 includes the substrate 812 and the previously planar wiregrid polarizer 804A that has been laminated onto the substrate 812 to generate the laminated wiregrid polarizer 814. In some examples, the laminated wiregrid polarizer 814 may be coupled to the substrate 812 using an index-matching material. The index matching material may include a substance, such as a liquid, cement (adhesive), or gel, which has an index of refraction that closely approximates that of the laminated wiregrid polarizer 814 or the substrate 812. By using an index-matching material between the substrate 812 and the laminated wiregrid polarizer 814, radiation may pass from the substrate 812 to the laminated wiregrid polarizer 814 without significant reflection or refraction. In some examples, polymers dissolved in volatile organic compounds (VOCs), such as nitrocellulose, and acrylic compounds dissolved in lacquer thinner and/or a mixture of several solvents (typically containing butyl acetate and xylene or toluene) may be used as an index-matching material.

In some embodiments, the pitch and/or orientation of the wires in a wiregrid reflective polarizer film (e.g., wiregrid polarizer wire layer 810 and wiregrid substrate 808) may determine the extinction ratio of the resulting wiregrid polarizer 814 incorporating (e.g., via lamination) the wiregrid reflective polarizer film. For example, wires that are configured to be tightly packed spatially (e.g., having a horizontal pitch above a given threshold) in the wiregrid reflective polarizer film may provide a greater polarization effect (e.g., higher extinction ratio) for the wiregrid polarizer. In some embodiments, wires of a wiregrid reflective polarizer film that are disposed (e.g., laminated) on an outside surface (e.g., a convex-shaped surface) of a wiregrid polarizer may splay (e.g., spread out and not be tightly packed as a result). In one aspect, wires of a wiregrid reflective polarizer film disposed (e.g., laminated) on the inside surface (e.g., a concave-shaped surface) of the wiregrid polarizer may be compressed together by packing the wires together and reducing gaps between the wires, thereby improving the extinction ratio of the wiregrid polarizer.

Figure 9:
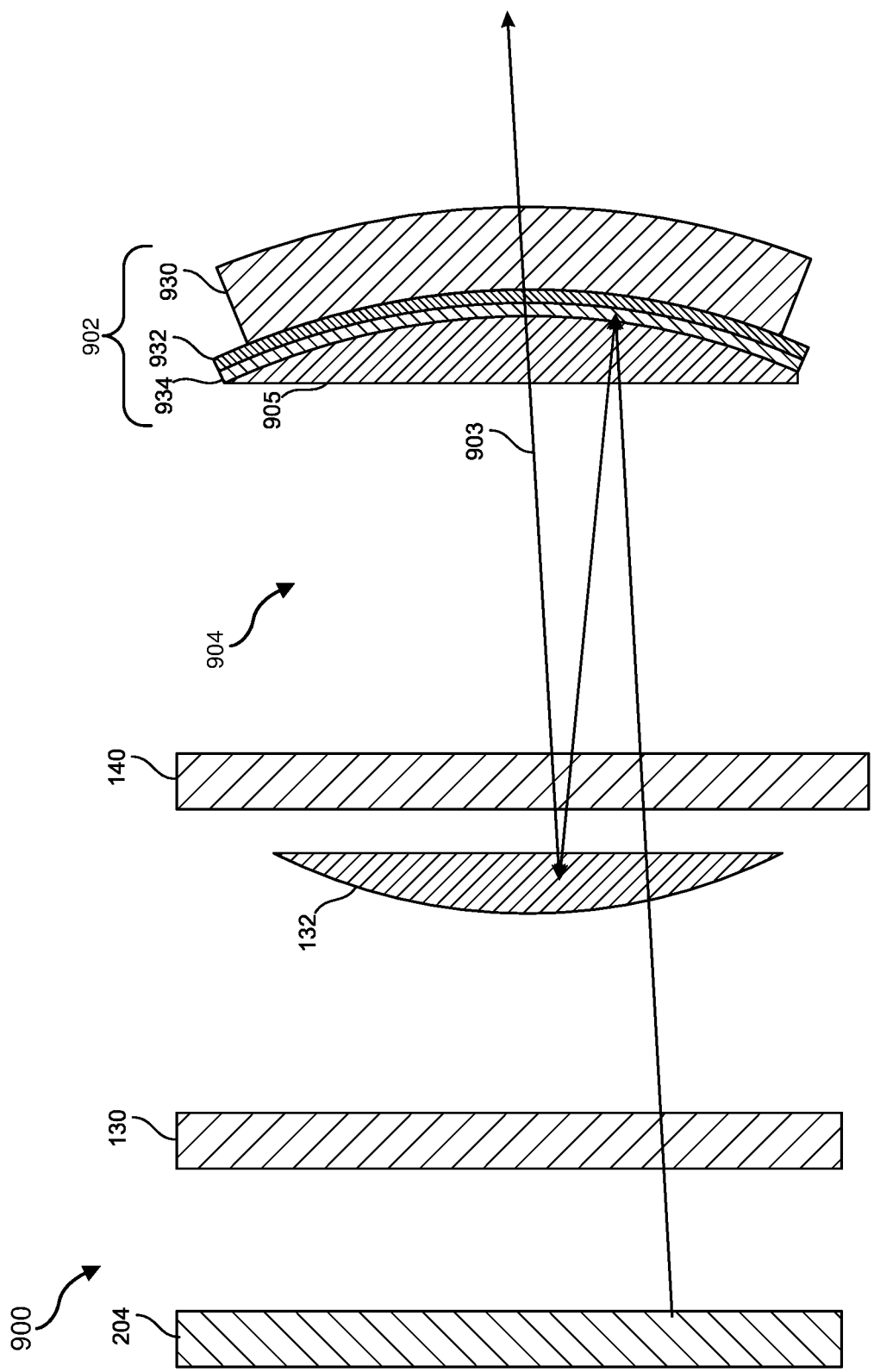
FIG. 9 shows a diagram of an example reverse order crossed pancake lens block implementing shaped reflective polarizers, in accordance with example embodiments of the disclosure.

FIG. 9 shows a diagram of an example optical system implementing shaped reflective polarizers, in accordance with example embodiments of the disclosure. In particular, diagram 900 shows a reverse order crossed pancake lens block that includes an initial polarizer 204 (e.g., a linear polarizer), back waveplate 130 (e.g., a first compound retarder), mirrored surface 132 (e.g., a partial reflector), front waveplate 140 (e.g., a second compound retarder), a shaped reflective polarizer 902 (e.g., including a laminated wiregrid polarizer).

In some embodiments, the shaped reflective polarizer 902 may include an optical element 905 (e.g., a lens), bolstering substrate 930, wiregrid polarizer substrate layer 932, and a wiregrid polarizer wire layer 934 (e.g., similar to bolstering substrate 806, wiregrid polarizer substrate layer 808, and wiregrid polarizer wire layer 810, respectively, shown and described in connection with FIG. 8, above).

In some embodiments, as noted, the wires of shaped reflective polarizer 902 (e.g., wires of the wiregrid substrate 808) may be facing a cavity 904 (e.g., a cavity including air or a material such as a nanovoided material). Further, a portion of the wires of the shaped reflective polarizer 902 may be embedded in a substrate material (e.g., a resin), such as wiregrid polarizer substrate layer 932. The shaped reflective polarizer 902 may thereby have a side facing a bolstering material 930 and a side that faces the cavity 904. Accordingly, the wires in the wiregrid polarizer wire layer 934 of the shaped reflective polarizer 902 may point toward the bolstering substrate 930 or away from the bolstering substrate 930. In some embodiments, the bolstering material 930 and the wiregrid substrate material 932 may be provided for improving the mechanical properties of the shaped reflective polarizer 902 (e.g., stability, two-axis lamination onto optical element 905, etc.) but may not be used to effect the optical properties of the shaped reflective polarizer 902; therefore, the bolstering material 930 and/or the wiregrid polarizer substrate layer 932 may be designed to minimally affect the polarization management of the pancake lens block. In particular, the wires of the wiregrid polarizer wire layer 934 may be configured to be concave with respect to the shaped reflective polarizer 902 structure and the optical element 905 surface such that the wires may be formed on the inside of the shaped reflective polarizer 902, and the wires of the wiregrid polarizer wire layer 934 may face cavity 904 and initial polarizer 204.

Further, as shown in FIG. 9, the wiregrid polarizer substrate layer 932 may be configured to be positioned on the output side of the shaped reflective polarizer 902, and thereby to be couched away from the optical cavity 904 between the shaped reflective polarizer 902 and the front waveplate 140. In some embodiments, wires in the wiregrid polarizer wire layer 934 may be provided in the wiregrid polarizer substrate layer 932 of the shaped reflective polarizer 902 such that the wires are facing the initial polarizer 204. Further, the wires in the wiregrid polarizer wire layer 934 may be positioned on the outside of the convex surface of the optical element 905, and the bolstering material 930 may be introduced inside the polarization face of the shaped reflective polarizer 902. Further, the substrates (e.g., bolstering substrate 930 and wiregrid polarizer substrate layer 932) that serve as mechanical support for the wiregrid polarizer wire layer 934 may be provided outside the cavity 904.

In some embodiments, the shaped reflective polarizer 902 may be formed using vacuum thermoforming. In at least one embodiment, vacuum thermoforming may refer to a process where a sheet of material (e.g., plastic) may be heated to a forming temperature, stretched onto a mold, and forced against the mold by a vacuum. In some embodiments, the thicker the bolstering material 930, the longer the cycle time in a thermoforming process may need to be to thermoform the shaped reflective polarizer's 902 components (e.g., the bolstering material 930, the wiregrid polarizer substrate layer 932, and the wiregrid polarizer wire layer 934) to the optical element 905. This may expose delicate materials (e.g., wiregrids, resins, and the like) to higher temperatures for longer durations. Accordingly, there may be a trade-off in the thickness of the bolstering material 930 versus the maximum radius curvature of the spherical surface (e.g., a surface of an optical element 905 such as a lens on which the shaped reflective polarizer 902 is laminated).

In some embodiments, the bolstering material 930 may need to be optically clear, optically neutral, and may need to have a glass transition temperature that does not vary quickly with temperature (e.g., to provide for a wide thermoforming operating window), and may need to have similar mechanical and/or optical properties to the material (e.g., wiregrid polarizer substrate layer 932 and/or wiregrid polarizer wire layer 934) that is being formed. Accordingly, the bolstering substrate 930 may have a glass transition temperature characterized by an associated rate of change with temperature being below a given threshold.

In some embodiments, the light that travels through the bolstering substrate 930 may need to be relatively unaffected by the bolstering substrate 930 itself. In particular, the bolstering substrate 930 may need to be optically clear and neutral and should not introduce stress birefringence so as not to affect the polarization state of propagating light 903. Moreover, the bolstering substrate 930 should be outside the optical cavity 904 so that the reflective wiregrid polarizer wire layer 934 is on the inside (e.g., the concave side) of the optical element 905. In some embodiments, the polarized light may thereby be incident on the wiregrid polarizer wire layer 934 before the light is incident on the bolstering material 930. The wiregrid polarizer wire layer 934 may be facing the direction of the initial polarizer 204 and/or a display (not shown) and facing the optical cavity 904 between the shaped reflective polarizer 902 and the front waveplate 140 where the polarization of light 903 is managed.

In some embodiments, the wires of the wiregrid polarizer wire layer 934 may have air on one side of the film (e.g., air on the polarization management side of the film) (not shown). In another configuration, the wiregrid polarizer wire layer 934 may include a carrier film on the polarization management side of the film (not shown). Based on Maxwell equations, the index of refraction of the material of the medium surrounding the wires on the wiregrid film may influence the polarization efficiency (e.g., the extinction ratio) of the shaped reflective polarizer 902 including such a wiregrid polarizer wire layer 934. In particular, wires of the wiregrid polarizer wire layer 934 may have the highest polarization efficiency when having an air interface versus another material. Accordingly, the wiregrid polarizer substrate layer 932 for the wiregrid polarizer wire layer 934 may be laminated to the bolstering substrate 930 and the structure may be oriented such that the wires of the wiregrid polarizer wire layer 934 face towards the cavity 904 between the shaped reflective polarizer 902 and the front waveplate 140.

Figure 10:
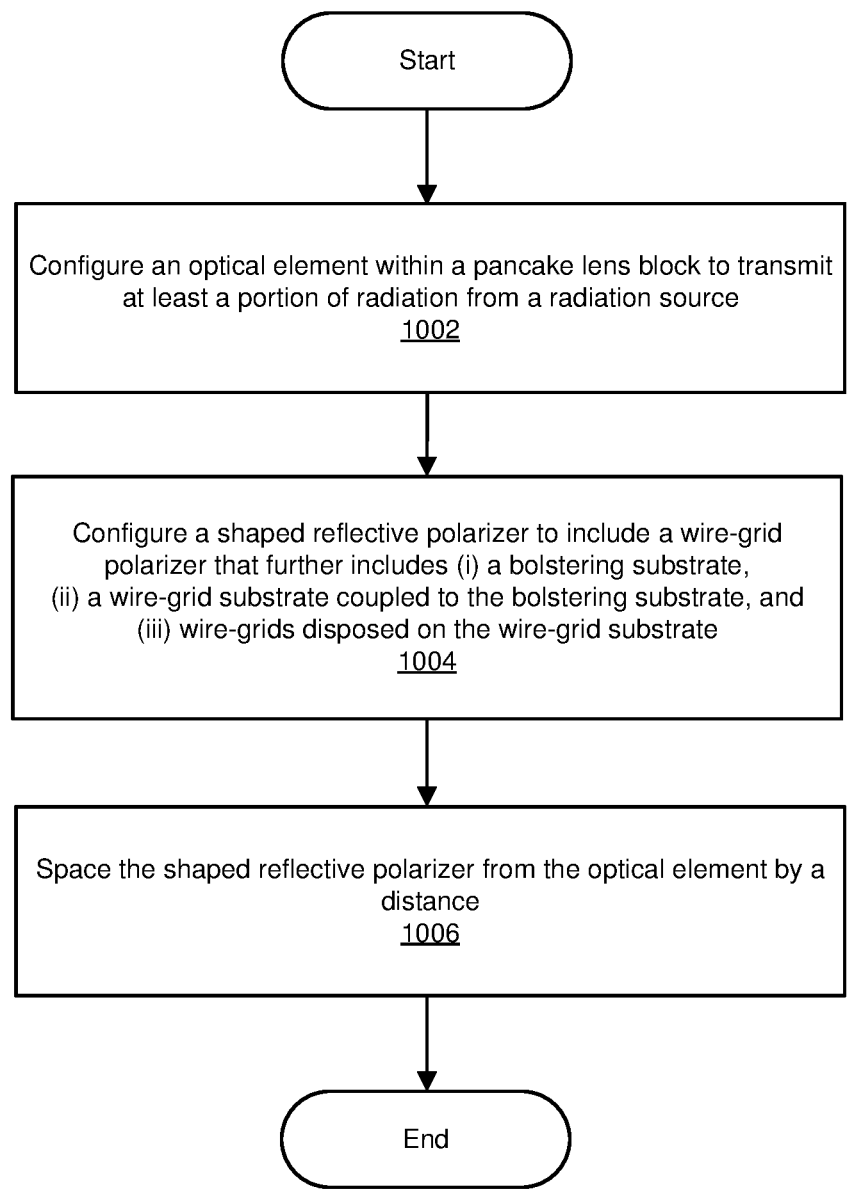
FIG. 10 shows a diagram of an example flow chart for performing example operations associated with the pancake lens having shaped reflective polarizers, in accordance with example embodiments of the disclosure.

FIG. 10 shows a flow diagram of an example method 1000 for producing a pancake lens block including a shaped reflective polarizer, in accordance with example embodiments of the disclosure. At step 1002, an optical element may be configured to transmit at least a portion of radiation from a radiation source, in accordance with various embodiments disclosed herein. In particular, the optical component may include a first retarder having a first axis of orientation, where the first retarder is configured to selectively transmit a portion of the radiation from the radiation source (e.g., a display). Further the optical component may include a partial reflector that receives the portion of radiation from the first retarder and transmits the portion of radiation. The optical component may also include a second retarder having a surface at a distance from the shaped reflective polarizer, where the second retarder is oriented to a second axis of orientation that is substantially orthogonal to the first axis of orientation, and where the second retarder transmits the portion of radiation from the partial reflector.

At step 1004 in FIG. 10, a shaped reflective polarizer may be configured to include a wire-grid polarizer that includes (i) a bolstering substrate, (ii) a wire-grid substrate coupled to the bolstering substrate, and (iii) wire-grids disposed on the wire-grid substrate, in accordance with various embodiments disclosed herein. In at least one embodiment, the bolstering substrate or the wire-grid substrate may include a tri-acetyl cellulose (TAC) material or a poly-methyl methacrylate (PMMA) material. In some embodiments, the thickness of the bolstering substrate or the wire-grid substrate may be dependent on the radius of curvature of an underlying optical component on which the bolstering substrate or the wire-grid substrate are coupled (e.g., laminated).

At step 1006 in FIG. 10, the shaped reflective polarizer may be spaced from the optical element by a distance, in accordance with various embodiments disclosed herein. In at least one embodiment, the distance may define a cavity that may be filled with a material (e.g., air or another material such as nanovoided materials). In some embodiments, the nanovoided materials may be designed to a predetermined index of refraction. In at least one embodiment, the distance may be configured to provide achromatic optical power to the pancake lens block.

Figure 11:
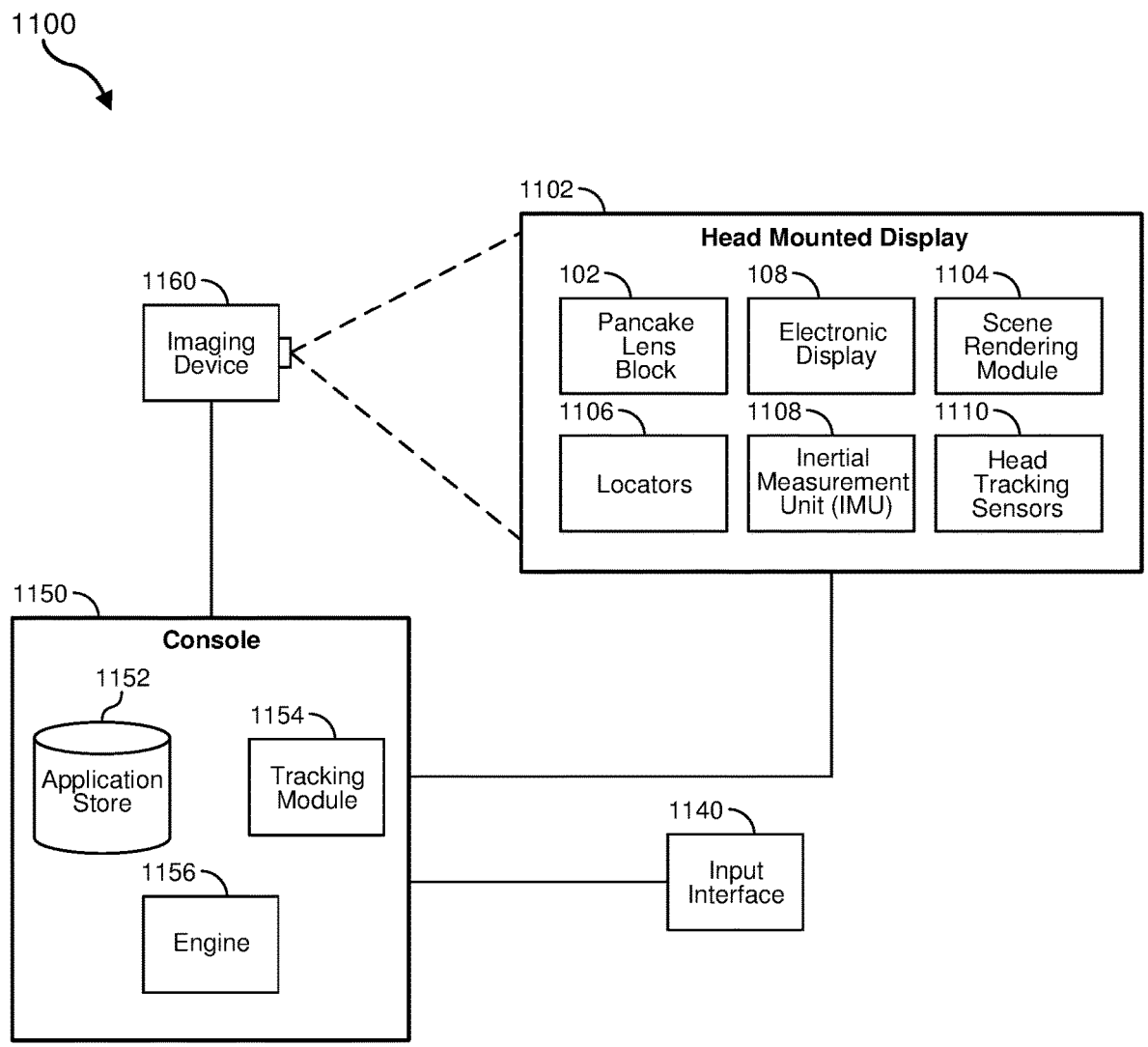
FIG. 11 shows a diagram of an example system environment in which a head-mounted display with a pancake lens operates, in accordance with at least one embodiment.

FIG. 11 is a block diagram of an exemplary system environment 1100 including an HMD 1102 that includes pancake lens block 102. System environment 1100 shown by FIG. 11 includes an HMD 1102, an imaging device 1160, and an input interface 1140 that are each coupled to a console 1150. While FIG. 11 shows an example system 1100 including one HMD 1102, one imaging device 1160, and one input interface 1140, in other embodiments any suitable number of these components may be included in the system 1100. For example, there may be multiple HMDs 1102, each having an associated input interface 1140 and being monitored by one or more imaging devices 1160, with each HMD 1102, input interface 1140, and imaging device 1160 communicating with the console 1150. In alternative configurations, different and/or additional components may be included in the system environment 1100. The system 1100 may operate in a system environment, an augmented reality (AR) system environment, a mixed reality (MR) system environment, or some combination thereof. In some embodiments, at least one of imaging device 1160, console 1150, and/or input interface 1140 may be included within HMD 1102 and/or may be external to HMD 1102.

HMD 1102 may present content to a user. Example content may include images, video, audio, or some combination thereof. Audio content may be presented via a separate device (e.g., speakers and/or headphones) external to HMD 1102 that receives audio information from HMD 1102, console 1150, or both. In some embodiments, HMD 1102 may include pancake lens block 102, an electronic display 108, locators 1106, an internal measurement unit (IMU) 1108, head tracking sensors 1110, and/or a scene rendering module 1104. In some embodiments, the HMD 1102 may present virtual reality (VR) elements, augmented reality (AR) elements, mixed reality (MR) elements, or some combination thereof to a user. In the AR and/or MR embodiments, the HMD 1102 may augment views of a physical, real-world environment with computer-generated elements (e.g., images, video, sound, etc.).

Electronic display screen 108 may present visual information (i.e., image light) from an electronic signal. The electronic display 108 may be, e.g., a liquid crystal display (LCD), an organic light emitting diode (OLED) display, an active-matrix organic light-emitting diode display (AMOLED), some type of flexible display, some combination thereof, and/or any other suitable type of emissive display. In some embodiments, electronic display screen 108 may include a linear polarizer and/or may admit light that is linearly polarized.

Pancake lens block 102 may direct light from electronic display 108 to an exit pupil for viewing by a user using one or more optical elements in addition to two curved optical elements (e.g., front optical element 104 and back optical element 106 described in reference to FIGS. 1-2). For example, the one or more optical elements may include at least one of apertures, Fresnel lenses, convex lenses, concave lenses, filters, and so forth, and may include combinations of different optical elements. In some embodiments, one or more of the optical elements of pancake lens block 102 may have one or more coatings, such as anti-reflective coatings. Magnification of the image light by pancake lens block 102 may allow electronic display 108 to be physically smaller, weigh less, and consume less power than larger displays. Additionally, magnification of the image light may increase a field of view of the displayed content. For example, the field of view of the displayed content may be such that the displayed content is presented using almost all (e.g., 150 degrees diagonal), and in some cases all, of the user's field of view.

Locators 1106 may represent objects located in specific positions on HMD 1102 relative to one another and relative to a specific reference point on HMD 1102. Locators 1106 may be, for example, a light emitting diode (LED), a corner cube reflector, a reflective marker, a type of light source that contrasts with an environment in which HMD 1102 operates, or some combination thereof. Active locators 1106 (e.g., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 1106 may be located beneath an outer surface of HMD 1102, which is transparent to the wavelengths of light emitted or reflected by locators 1106 or is thin enough to not substantially attenuate the wavelengths of light emitted or reflected by locators 1106. Further, the outer surface or other portions of HMD 1102 may be opaque in the visible band of wavelengths of light. Thus, locators 1106 may emit light in the IR band while under an outer surface of HMD 1102 that is transparent in the IR band but opaque in the visible band.

IMU 1108 may represent an electronic device that generates fast calibration data based on measurement signals received from one or more of head tracking sensors 1110, which generate one or more measurement signals in response to motion of HMD 1102. Examples of head tracking sensors 1110 include accelerometers, gyroscopes, magnetometers, other sensors suitable for detecting motion, correcting error associated with IMU 1108, or some combination thereof. Head tracking sensors 1110 may be located external to IMU 1108, internal to IMU 1108, or some combination thereof.

Based on the measurement signals from head tracking sensors 1110, IMU 1108 may generate fast calibration data indicating an estimated position of HMD 1102 relative to an initial position of HMD 1102. For example, head tracking sensors 1110 may include multiple accelerometers to measure translational motion (forward/back, up/down, left/right) and multiple gyroscopes to measure rotational motion (e.g., pitch, yaw, and roll). IMU 1108 may, for example, rapidly sample the measurement signals and calculate the estimated position of HMD 1102 from the sampled data. For example, IMU 1108 may integrate measurement signals received from the accelerometers over time to estimate a velocity vector and integrate the velocity vector over time to determine an estimated position of a reference point on HMD 1102. The reference point may represent a point that may be used to describe the position of HMD 1102. While the reference point may generally be defined as a point in space, in various embodiments, reference point may be defined as a point within HMD 1102 (e.g., a center of the IMU 1108). Alternatively, IMU 1108 may provide the sampled measurement signals to console 1150, which determines the fast calibration data.

IMU 1108 may additionally receive one or more calibration parameters from console 1150. As further discussed below, the one or more calibration parameters may be used to maintain tracking of HMD 1102. Based on a received calibration parameter, IMU 1108 may adjust one or more IMU parameters (e.g., sample rate). In some embodiments, certain calibration parameters may cause IMU 1108 to update an initial position of the reference point to correspond to a next calibrated position of the reference point. Updating the initial position of the reference point as the next calibrated position of the reference point may help reduce accumulated error associated with determining the estimated position. This accumulated error, also referred to as drift error, may cause the estimated position of the reference point to "drift" away from the actual position of the reference point over time.

Scene rendering module 1104 may receive content for the virtual scene from engine 1156 and provide the content for display on electronic display 108. Additionally, scene rendering module 1104 may adjust the content based on information IMU 1108 and head tracking sensors 1110. For example, upon receiving the content from engine 1156, scene rendering module 1104 may adjust the content based on the predicted state (i.e., eye position and focal length) of pancake lens block 102 received from a focus prediction module. Additionally, scene rendering module 1104 may determine a portion of the content to be displayed on electronic display 108 based on one or more of tracking module 1154, head tracking sensors 1110, or IMU 1108, as described further below.

Imaging device 1160 may generate slow calibration data in accordance with calibration parameters received from console 1150. Slow calibration data may include one or more images showing observed positions of locators 1106 that are detectable by imaging device 1160. Imaging device 1160 may include one or more cameras, one or more video cameras, other devices capable of capturing images including one or more locators 1106, or some combination thereof. Additionally, imaging device 1160 may include one or more filters (e.g., for increasing signal to noise ratio). Imaging device 1160 may be configured to detect light emitted or reflected from locators 1106 in a field of view of imaging device 1160. In embodiments where locators 1106 include passive elements (e.g., a retroreflector), imaging device 1160 may include a light source that illuminates some or all of locators 1106, which retro-reflect the light towards the light source in imaging device 1160. Slow calibration data may be communicated from imaging device 1160 to console 1150, and imaging device 1160 may receive one or more calibration parameters from console 1150 to adjust one or more imaging parameters (e.g., focal length, focus, frame rate, ISO, sensor temperature, shutter speed, aperture, etc.).

Input interface 1140 may represent a device that allows a user to send action requests to console 1150. An action request may represent a request to perform a particular action. For example, an action request may be to start or end an application or to perform a particular action within the application. Input interface 1140 may include one or more input devices. Example input devices include a keyboard, a mouse, a game controller, and/or any other suitable device for receiving action requests and communicating the received action requests to console 1150. An action request received by input interface 1140 may be communicated to console 1150, which performs an action corresponding to the action request. In some embodiments, input interface 1140 may provide haptic feedback to the user in accordance with instructions received from console 1150. For example, haptic feedback may be provided by the input interface 1140 when an action request is received and/or console 1150 communicate instructions to input interface 1140 causing input interface 1140 to generate haptic feedback when console 1150 performs an action.

Console 1150 may provide content to HMD 1102 for presentation to the user in accordance with information received from imaging device 1160, HMD 1102, or input interface 1140. In the example shown in FIG. 11, console 1150 may include an application store 1152, a tracking module 1154, and an engine 1156. Some embodiments of console 1150 may have different or additional modules than those described in conjunction with FIG. 11. Similarly, the functions further described below may be distributed among components of console 1150 in a different manner than is described herein.

Application store 1152 may store one or more applications for execution by console 1150. An application may represent a group of instructions, that when executed by a processor, generates content for presentation to the user. Content generated by an application may be in response to inputs received from the user via movement of HMD 1102 or interface device 1140. Examples of applications include gaming applications, conferencing applications, video playback application, or other suitable applications.

Tracking module 1154 may calibrate the system using one or more calibration parameters and may adjust one or more calibration parameters to reduce error in determining position of HMD 1102. For example, tracking module 1154 may adjust the focus of imaging device 1160 to obtain a more accurate position for observed locators 1106 on HMD 1102. Moreover, calibration performed by tracking module 1154 may also account for information received from IMU 1108. Additionally, if tracking of HMD 1102 is lost (e.g., imaging device 1160 loses line of sight of at least a threshold number of locators 1106), tracking module 1154 may re-calibrate some or all of the system components.

Additionally, tracking module 1154 may track the movement of HMD 1102 using, for example, slow calibration information from imaging device 1160 and may determine positions of a reference point on HMD 1102 using observed locators from the slow calibration information and a model of HMD 1102. Tracking module 1154 may additionally or alternatively determine positions of the reference point on HMD 1102 using position information from fast calibration information from IMU 1108 on HMD 1102. Additionally, tracking module 1154 may use portions of the fast calibration information, the slow calibration information, some combination thereof, and/or any other suitable positional information to predict a future location of HMD 1102, which is provided to engine 1156.

Engine 1156 may execute applications within the system and receive position information, acceleration information, velocity information, predicted future positions, some combination thereof, and/or any other suitable data for HMD 1102 from tracking module 1154. Based on the received information, engine 1156 may determine content to provide to HMD 1102 for presentation to the user, such as a virtual scene. For example, if the received information indicates that the user has looked to the left, engine 1156 may generate content for HMD 1102 that includes optical elements or tracks the user's movement in a virtual environment. Additionally or alternatively, engine 1156 may perform an action within an application executing on console 1150 in response to an action request received from the input interface 1140 and provide feedback to the user that the action was performed. The provided feedback may, for example, be visual or audible feedback via HMD 1102 and/or haptic feedback via input interface 1140.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As detailed above, the computing devices, display devices, and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A pancake lens block, comprising:
an optical element configured to transmit at least a portion of radiation from a radiation source;
a shaped reflective polarizer spaced at a distance from the optical element, wherein:
   the shaped reflective polarizer is configured to provide achromatic optical reflection of the portion of radiation within the pancake lens block; and
   the shaped reflective polarizer comprises:
      a curved lens having a radius of curvature and at least one convex-shaped surface; and
      a wire-grid polarizer shaped in two axes, the wire-grid polarizer comprising:
         a wire-grid film;
         a wire grid disposed on the wire-grid film, wherein the wire grid comprises a set of wires packed together on a concave-shaped surface of the wire-grid film; and
         a bolstering substrate having a concave-shaped surface shaped to the convex-shaped surface of the curved lens and being coupled to the wire-grid film, wherein the bolstering substrate is configured to:
            provide mechanical support to the wire-grid film to prevent the wire-grid film from buckling during a lamination process in which the wire-grid polarizer is coupled to the convex-shaped surface of the curved lens such that the wire grid is oriented toward the curved lens and the concave-shaped surface of the wire-grid film is oriented toward the curved lens; and
            maintain a polarization state of the portion of radiation transmitted by the optical element; and
a nanovoided material positioned between the optical element and the shaped reflective polarizer.

2. The pancake lens block of claim 1, wherein the optical element comprises:
a first retarder having a first axis of orientation, where the first retarder is configured to selectively transmit the portion of radiation from the radiation source;
a partial reflector that receives the portion of radiation from the first retarder and transmits the portion of radiation; and
a second retarder having a surface and being at the distance from the shaped reflective polarizer, where the second retarder is oriented to a second axis of orientation that is substantially orthogonal to the first axis of orientation, and where the second retarder transmits the portion of radiation from the partial reflector.

3. The pancake lens block of claim 2, wherein the shaped reflective polarizer is configured to reflect the portion of radiation transmitted by the second retarder back to the partial reflector through the second retarder, where the partial reflector reflects a second portion of the radiation from the second retarder back to the shaped reflective polarizer.

4. The pancake lens block of claim 1, wherein the bolstering substrate comprises a tri-acetyl cellulose (TAC) material or a poly-methyl methacrylate (PMMA) material.

5. The pancake lens block of claim 1, wherein the wire-grid polarizer is thermoformed and the bolstering substrate has a glass transition temperature characterized by an associated rate of change with temperature being below a threshold.

6. The pancake lens block of claim 1, wherein the wire-grid film comprises a TAC material or a PMMA material.

7. The pancake lens block of claim 1, wherein the wire grid comprise a TAC material.

8. The pancake lens block of claim 1, wherein:
the distance is configured to provide additional optical path length in the pancake lens block.

9. The pancake lens block of claim 1, wherein each wire included in the set of wires has at least one dimension that is less than a micron.

10. A head mounted display (HMD) comprising:
an electronic display configured to emit light; and
a pancake lens block comprising:
   an optical element configured to transmit at least a portion of the light emitted by the electronic display;
   a shaped reflective polarizer spaced at a distance from the optical element, wherein:
      the shaped reflective polarizer is configured to provide achromatic optical reflection of the portion of light within the pancake lens block; and
      the shaped reflective polarizer comprises:
         a curved lens having a radius of curvature and at least one convex-shaped surface; and
         a wire-grid polarizer shaped in two axes, the wire-grid polarizer comprising:
            a wire-grid film;
            a wire grid disposed on the wire-grid film, wherein the wire grid comprises a set of wires are packed together on a concave-shaped surface of the wire-grid film; and
            a bolstering substrate having a concave-shaped surface shaped to the convex-shaped surface of the curved lens and being coupled to the wire-grid film, wherein the bolstering substrate is configured to:
               provide mechanical support to the wire-grid film to prevent the wire-grid film from buckling during a lamination process in which the wire-grid polarizer is coupled to the convex-shaped surface of the curved lens such that the wire grid is oriented toward the curved lens and the concave-shaped surface of the wire-grid film is oriented toward the curved lens; and
               maintain a polarization state of the portion of light emitted by the electronic display; and
   a nanovoided material positioned between the optical element and the shaped reflective polarizer.

11. The HMD of claim 10, wherein the optical element comprises:
a first retarder having a first axis of orientation, where the first retarder is configured to selectively transmit the portion of the light emitted by the electronic display;
a partial reflector that receives the portion of light from the first retarder and transmits the portion of light; and a second retarder having a surface and being at the distance from the shaped reflective polarizer, and where the second retarder is oriented to a second axis of orientation that is substantially orthogonal to the first axis of orientation, and where the second retarder transmits the portion of light from the partial reflector.

12. The HMD of claim 11, wherein the shaped reflective polarizer is configured to reflect the portion of light transmitted by the second retarder back to the partial reflector through the second retarder, where the partial reflector reflects a second portion of the light from the second retarder back to the shaped reflective polarizer.

13. The HMD of claim 10, wherein the bolstering substrate comprises a tri-acetyl cellulose (TAC) material or a poly-methyl methacrylate (PMMA) material.

14. A method of assembling a pancake lens block, the method comprising:
  configuring an optical element to transmit at least a portion of radiation from a radiation source;
  spacing a shaped reflective polarizer from the optical element by a distance, wherein:
    the shaped reflective polarizer is configured to provide achromatic optical reflection of the portion of radiation within the pancake lens block; and
    the shaped reflective polarizer comprises:
      a curved lens having a radius of curvature and at least one convex-shaped surface; and
      a wire-grid polarizer shaped in two axes, the wire-grid polarizer comprising:
        a wire-grid film;
        a wire grid disposed on the wire-grid film, wherein the wire grid comprises a set of wires packed together on a concave-shaped surface of the wire-grid film; and
        a bolstering substrate having a concave-shaped surface shaped to the convex-shaped surface of the curved lens and being coupled to the wire-grid film, wherein the bolstering substrate is configured to:
          provide mechanical support to the wire-grid film to prevent the wire-grid film from buckling during a lamination process in which the wire-grid polarizer is coupled to the convex-shaped surface of the curved lens such that the wire grid is oriented toward the curved lens and the concave-shaped surface of the wire-grid film is oriented toward the curved lens; and
          maintain a polarization state of the portion of radiation transmitted by the optical element; and
  positioning a nanovoided material between the optical element and the shaped reflective polarizer.

* * * * *

UNITED STATES PATENT AND TRADEMARK OFFICE
CERTIFICATE OF CORRECTION

| | |
|---|---|
| PATENT NO. | : 11,226,483 B2 |
| APPLICATION NO. | : 16/159752 |
| DATED | : January 18, 2022 |
| INVENTOR(S) | : Sharp |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 152 days.

Signed and Sealed this
Twenty-ninth Day of November, 2022

Katherine Kelly Vidal
*Director of the United States Patent and Trademark Office*